(12) United States Patent
Ooyama

(10) Patent No.: US 6,634,977 B2
(45) Date of Patent: Oct. 21, 2003

(54) CLUTCH CONTROL SYSTEM IN CONTINUOUSLY VARIABLE TRANSMISSION SYSTEM FOR VEHICLE

(75) Inventor: Kazuo Ooyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/013,947

(22) Filed: Dec. 13, 2001

(65) Prior Publication Data

US 2002/0086764 A1 Jul. 4, 2002

(30) Foreign Application Priority Data

Dec. 14, 2000 (JP) ............................................ 2000-380833

(51) Int. Cl.$^7$ ................................................ F16H 37/02
(52) U.S. Cl. ........................................ 475/208; 475/209
(58) Field of Search ............................... 475/208, 209

(56) References Cited

U.S. PATENT DOCUMENTS 5,980,420 A * 11/1999 Sakamoto et al. ............ 476/10
6,287,232 B1 * 9/2001 Sakai et al. ................. 475/216
6,409,625 B1 * 6/2002 Sakai et al. ................. 475/208

* cited by examiner

*Primary Examiner*—Dirk Wright
(74) *Attorney, Agent, or Firm*—Armstrong, Westerman, & Hattori, LLP

(57) ABSTRACT

An engine is connected to a sun gear of a planetary gear train via a toroidal type continuously variable transmission; driven wheels are connected to a ring gear of the planetary gear train; and the sun gear and the ring gear are connected to each other by a first clutch. A shifter can connect a second clutch, which is connected to the engine, to a carrier of the planetary gear train or to the driven wheels. When the vehicle is started forward when a failure has occurred, by controlling the engagement force of the first clutch on the basis of the rotational rate of the engine and the ratio of the toroidal type continuously variable transmission and controlling the engagement force of the second clutch on the basis of the rotational rate of the engine while the second clutch is connected to the carrier by the shifter, it is possible to prevent the ratio of the toroidal type continuously variable transmission from changing beyond the LOW ratio or the OD ratio and generating an excessive load.

3 Claims, 22 Drawing Sheets

CLUTCH CONTROL SYSTEM IN CONTINUOUSLY VARIABLE TRANSMISSION SYSTEM FOR VEHICLE

BACKGROUND OF THE INVENTION

1. Field of the Invention

The present invention relates to a continuously variable transmission system for a vehicle employing a combination of a continuously variable transmission and a planetary gear train and, in particular, to a clutch control system therein.

2. Description of the Related Art

Such a continuously variable transmission system for a vehicle is known in Japanese Patent Application Laid-open No. 10-196759.

In accordance with this continuously variable transmission system for a vehicle, when the vehicle is traveling at a low speed the engine torque is transmitted to the driven wheels via a toroidal type continuously variable transmission alone, and when the vehicle is traveling at a high speed the engine torque is transmitted to the driven wheels via both the toroidal type continuously variable transmission and a planetary gear train, and a wide range of ratios that cannot be achieved by use of the toroidal type continuously variable transmission alone can thereby be achieved.

Japanese Patent Application Laid-open No. 9-210168 discloses a toroidal type continuously variable transmission in which, by controlling the engagement force of a clutch provided on the output shaft according to the shift ratio, the energy loss accompanying operation of the clutch is reduced, thereby maintaining high efficiency. Japanese Patent Application Laid-open No. 11-257445 discloses an arrangement in which, when the control system of a belt type continuously variable transmission fails, the starting clutch is controlled by changing a control hydraulic pressure according to the rotational rate of the engine, thereby enabling the vehicle to start.

In order to control the ratio of a toroidal type continuously variable transmission, such as that disclosed in the above-mentioned Japanese Patent Application Laid-open No. 10-196759, an electronically controlled device such as a solenoid valve is used, but if the electronic control system fails, the ratio of the toroidal type continuously variable transmission cannot be controlled in some cases. If such a failure occurs when the vehicle is stationary, then when the vehicle is starting, a load that changes the ratio of the toroidal type continuously variable transmission beyond the LOW ratio or a load that changes the ratio thereof beyond the OD ratio is generated, and a large load is thus applied to the input discs or output discs of the toroidal type continuously variable transmission, thereby causing a possibility that the durability could be degraded. Furthermore, if the ratio of the transmission is fixed at the OD ratio, a torque that is transmitted to the driven wheels decreases, thereby causing a possibility that the starting performance could be degraded to a great extent or the vehicle speed could become excessive due to a high ratio when the vehicle reverses.

SUMMARY OF THE INVENTION

The present invention has been carried out in view of the above-mentioned circumstances, and it is an object of the present invention to prevent degradation in the starting performance and durability of a continuously variable transmission for a vehicle by appropriately controlling the ratio of the transmission even when the electronic control system of the continuously variable transmission fails.

In order to achieve the above-mentioned object, in accordance with an aspect of the present invention, there is proposed a clutch control system in a continuously variable transmission system, the continuously variable transmission system including a continuously variable transmission having an input member into which a torque of an engine is input and an output member to change the speed of rotation of the input member and to output the rotation; a planetary gear train having a first element, a second element and a third element, the first element being connected to the output member of the continuously variable transmission and the second element being connected to driven wheels; a first clutch to engage the first element of the planetary gear train with the second element thereof; and a second clutch for engaging the engine with the third element of the planetary gear train, wherein the clutch control system includes a first control valve that controls the degree of engagement of the first clutch in accordance with the rotational rate of the engine and the shift ratio; and a second control valve that controls the degree of engagement of the second clutch in accordance with the rotational rate of the engine.

In accordance with the above-mentioned arrangement, when the vehicle travels forward at normal conditions (i.e., when there is no failure), gradually engaging the first clutch while the engagement of the second clutch is canceled, transmits the torque of the engine to the driven wheels via the continuously variable transmission and the first clutch, thereby starting the vehicle. When the first clutch is completely engaged as the vehicle speed increases, the vehicle is accelerated as the continuously variable transmission changes from the LOW ratio to the OD ratio (direct mode). When the ratio of the continuously variable transmission reaches the OD ratio, the second clutch is engaged and the engagement of the first clutch is canceled. The torque of the engine is input into the third element of the planetary gear train via the second clutch, a majority of the torque is transmitted from the second element to the driven wheels, thereby accelerating the vehicle; and a portion of the torque is returned back to the engine side from the first element via the output member and the input member of the continuously variable transmission (torque slip mode). When the continuously variable transmission is shifted from the OD ratio toward the LOW ratio in this state, the total ratio of the continuously variable transmission system changes beyond the OD ratio of the continuously variable transmission, thereby accelerating the vehicle.

When the vehicle reverses at normal conditions (i.e., when there is no failure), gradually engaging the second clutch transmits the torque of the engine to the driven wheels via the second clutch, thereby starting the vehicle. After the vehicle has started, the second clutch is completely engaged, and the vehicle is accelerated by increasing the rotational rate of the engine.

When the vehicle travels forward at a time when the electronic control system of the continuously variable transmission has failed, the vehicle is started by gradually engaging the first clutch and the second clutch. In this case, the ratio of the continuously variable transmission is set at a predetermined ratio between the LOW ratio and the OD ratio by balancing the engagement forces of the two clutches. That is, since the first control valve controls the degree of engagement of the first clutch in accordance with the ratio of the continuously variable transmission, feedback control can be carried out so that the ratio is maintained at a predetermined ratio between the LOW ratio and OD ratio. Moreover, since the first and second control valves control the degrees of engagement of the first and second clutches respectively in accordance with the rotational rate of the engine, it is possible to ensure a required torque transmission by changing the degrees of engagement of the first and second clutches in accordance with the rotational rate of the engine. When the first clutch is completely engaged, the ratio of the continuously variable transmission changes from the predetermined ratio toward the OD ratio. Subsequently, when the second clutch is completely engaged, the rotational rate of the engine is increased while the ratio of the continuously variable transmission is fixed at the OD ratio, thereby accelerating the vehicle. During this period, the torque of the engine is transmitted to the driven wheels via the second clutch and the planetary gear train. Therefore, the continuously variable transmission only carries out the speed change and is not involved in the transmission of torque. By engaging the first and second clutches with predetermined engagement forces when the vehicle travels forward at a time when the control system has failed, it is possible to prevent the ratio of the continuously variable transmission from changing beyond the LOW ratio or the OD ratio. Accordingly, generation of an excessive load can be prevented, thereby enhancing the durability of the continuously variable transmission.

When the vehicle reverses when there is a failure, the gradual engagement of the second clutch transmits the torque of the engine to the driven wheels via the second clutch, thereby starting the vehicle. After the vehicle has started, the second clutch is completely engaged, and the rotational rate of the engine is increased, thereby accelerating the vehicle. In this case, since the torque of the engine does not pass through the continuously variable transmission, it is possible to prevent degradation of the durability of the continuously variable transmission due to an excessive load.

In the cases of starting to travel in both the forward and reverse directions, since the ratio of the continuously variable transmission is not fixed at the OD ratio, the torque to be transmitted to the driven wheels does not decrease, which would greatly degrade the starting performance, and the vehicle speed does not become too high due to a high ratio after the vehicle has started to reverse.

The first element, the second element and the third element of the present invention correspond to a sun gear 39, a ring gear 40 and a carrier 41 respectively of a first embodiment. The first element, the second element and the third element of the present invention also correspond to a carrier 41', a sun gear 39' and a ring gear 40' respectively of a second embodiment and a third embodiment. The input member and the output member of the present invention correspond to input discs 62 and output discs 63 of the embodiments. The first control valve of the present invention corresponds to an SC back up valve 119 of the embodiments, and the second control valve of the present invention corresponds to an RSC back up valve 120 of the embodiments. Furthermore, the continuously variable transmission of the present invention corresponds to a toroidal type continuously variable transmission T of the embodiments.

The above-mentioned objects, other objects, characteristics and advantages of the present invention will become apparent from explanations of preferred embodiments that will be described in detail below by reference to the appended drawings.

BRIEF DESCRIPTION OF THE DRAWINGS

FIGS. 1 to 19 illustrate a first embodiment of the present invention.

FIG. 1 is a skeleton diagram of a continuously variable transmission system.

FIG. 2 is a map showing the layout of FIGS. 3 to 5.

FIG. 3 is a magnified view of part A in FIG. 2.

FIG. 4 is a magnified view of part B in FIG. 2.

FIG. 5 is a magnified view of part C in FIG. 2.

FIG. 6 is a cross section at line 6—6 in FIG. 3.

FIG. 7 is a map showing the layout of FIGS. 8 to 10.

FIG. 8 is a magnified view of part D in FIG. 7.

FIG. 9 is a magnified view of part E in FIG. 7.

FIG. 10 is a magnified view of part F in FIG. 7.

FIG. 14 is a graph illustrating the relationship of the amount discharged from the oil pump, the amount of lubricating oil, and the fore-and-aft pressure difference of the orifice to the rotational rate of the engine.

FIG. 15 is a graph illustrating the relationship of the first and second clutch hydraulic engagement pressures to the rotational rate of the engine.

FIG. 16 is a graph illustrating the relationship of the engagement forces of the first and second clutches to the rotational rate of the engine.

FIG. 17 is a graph illustrating the relationship of the engagement forces of the first and second clutches (sun gear torque basis) to the rotational rate of the engine.

FIG. 18 is a graph illustrating the relationship of the engine torque and the engagement force of the second clutch (input shaft torque basis) to the rotational rate of the engine.

FIG. 19 is a graph illustrating the relationship of the engagement forces of the first and second clutches (sun gear torque basis) when the rotational rate of the engine is 2500 rpm to the trunnion tilt angle (ratio).

FIGS. 20 to 21B illustrate a second embodiment of the present invention.

FIG. 20 is a skeleton diagram of a continuously variable transmission system.

FIGS. 21A and 21B are graphs of the speed of a planetary gear train.

DESCRIPTION OF PREFERRED EMBODIMENTS

Figure 1:
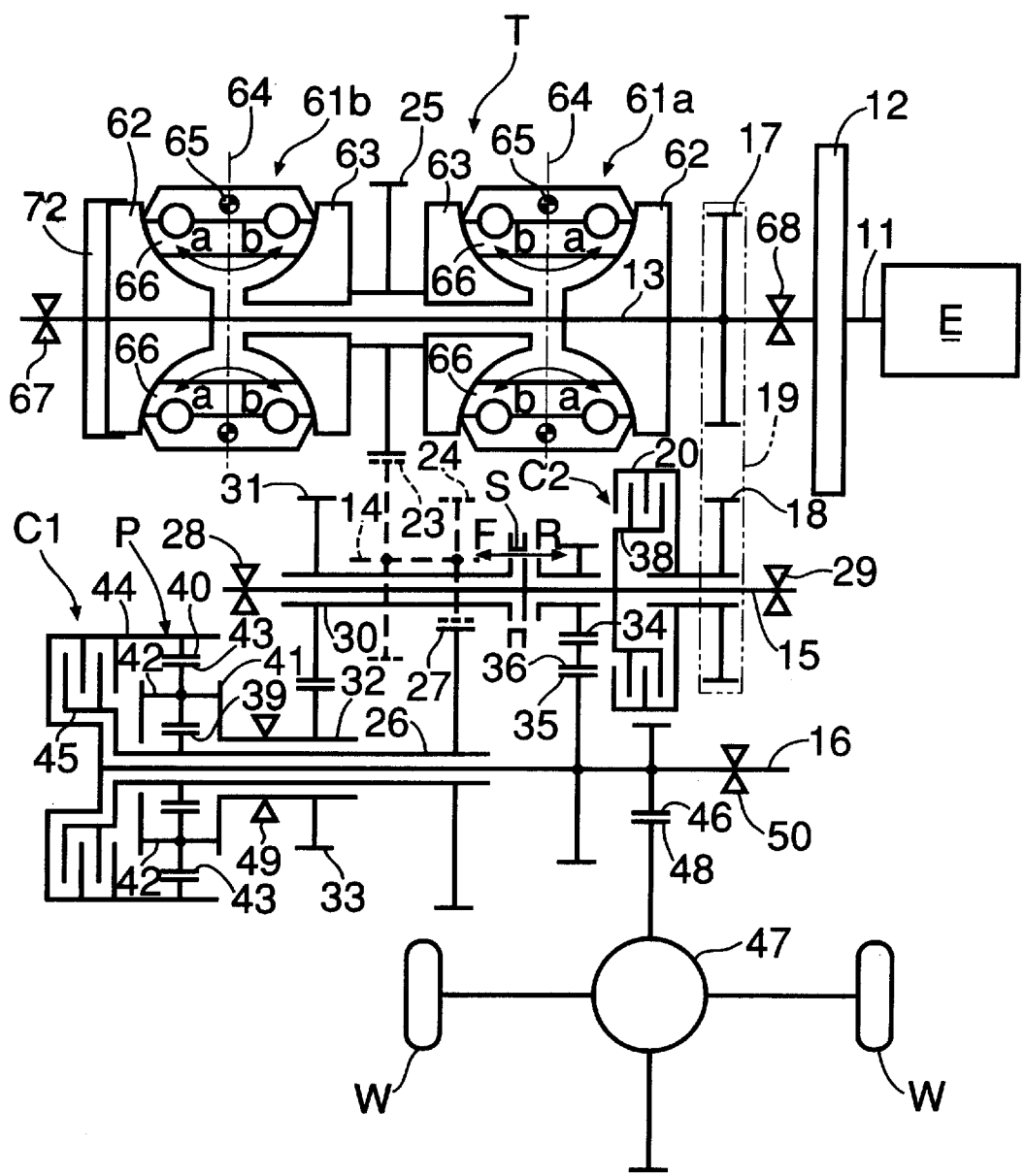
Figure 2:
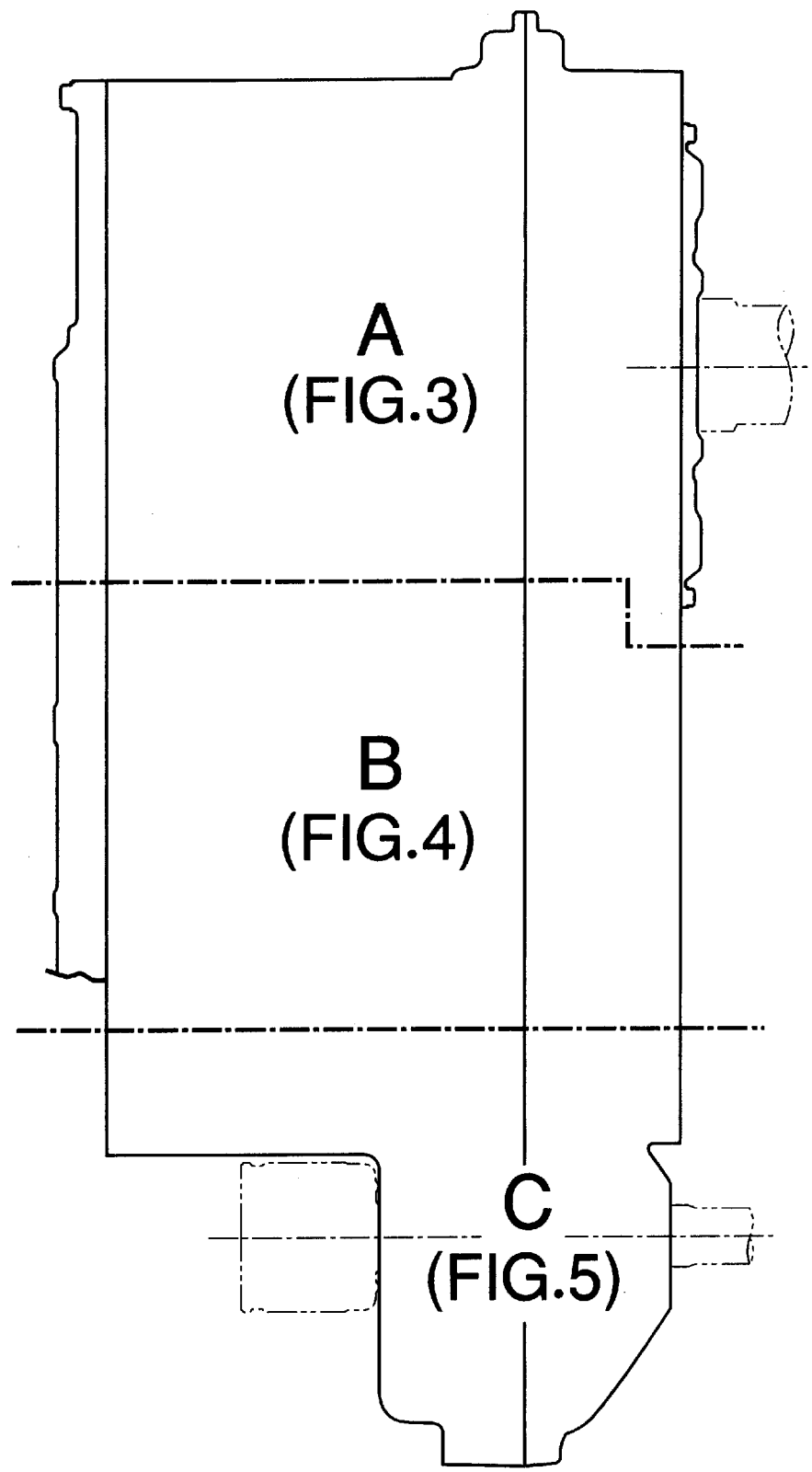

The first embodiment of the present invention is explained below by reference to FIGS. 1 to 19.

As shown in FIG. 1 and FIGS. 3 to 5, a continuously variable transmission system for an automobile includes a toroidal type continuously variable transmission T, a single pinion type planetary gear train P, a forward drive clutch C1 (hereinafter called a first clutch C1), which is a wet type multiplate clutch, and a reverse start and torque split clutch C2 (hereinafter called a second clutch C2), which is a wet type multiplate clutch. A crankshaft 11 of an engine E is connected to an input shaft 13 of the toroidal type continuously variable transmission T via a damper 12. Placed parallel to the input shaft 13 of the toroidal type continuously variable transmission T are a first shaft 14, a second shaft 15 and a third shaft 16. The first clutch C1 is provided on the left end of the third shaft 16, and the second clutch C2 is provided on the right end of the second shaft 15. A drive sprocket 17 is fixed to the input shaft 13 of the toroidal type continuously variable transmission T. A driven sprocket 18 is supported on the right end of the second shaft 15 in a relatively rotatable manner. The drive sprocket 17 and driven sprocket 18 are connected to each other via an endless chain 19. As a result, the driven sprocket 18 on the second shaft 15 and a clutch outer 20 of the second clutch C2 always rotate during operation of the engine E, the clutch outer 20 being integral with the driven sprocket 18.

Fixed to the first shaft 14, which is supported in a casing by a pair of bearings 21 and 22, are a first helical gear 23 and a second helical gear 24. The first helical gear 23 meshes with an output gear 25 of the toroidal type continuously variable transmission T, and the second helical gear 24 meshes with a third helical gear 27 fixed to a sleeve 26 fitted around the third shaft 16 in a relatively rotatable manner. A fourth helical gear 31 is fixed to a sleeve 30 fitted in a relatively rotatable manner around the second shaft 15, which is supported in the casing by a pair of bearings 28 and 29. The fourth helical gear 31 meshes with a fifth helical gear 33 that is fixed to a sleeve 32 fitted around the outer periphery of the sleeve 26 of the third shaft 16 in a relatively rotatable manner. A sixth helical gear 34 is supported on the second shaft 15 in a relatively rotatable manner and meshes, via an eighth helical gear 36, with a seventh helical gear 35 that is fixed to the third shaft 16. The eighth helical gear 36 is a reverse idle gear and is not illustrated in FIG. 4. The sleeve 30 (that is, the fourth helical gear 31) and the sixth helical gear 34 can be selectively linked to the second shaft 15 by a shifter S. Fixed to the second shaft 15 is a clutch inner 38 of the second clutch C2, and when the second clutch C2 is engaged, the driven sprocket 18 is therefore linked to the second shaft 15.

The planetary gear train P, which is provided on the third shaft 16, includes a sun gear 39 fixed to the sleeve 26, a ring gear 40, and a plurality of pinions 43 that are rotatably supported via a plurality of pinion shafts 42 on a carrier 41 fixed to the sleeve 32 and mesh with the sun gear 39 and the ring gear 40. The first clutch C1 includes a clutch outer 44, which is integral with the ring gear 40 of the planetary gear train P and the third shaft 16, and a clutch inner 45 which is integral with the sun gear 39 and the sleeve 26. When the first clutch C1 is engaged, the planetary gear train P is therefore locked, and the third shaft 16 joined to the ring gear 40, the sleeve 26 joined to the sun gear 39 and the sleeve 32 joined to the carrier 41 are unified. A final drive gear 46, that is fixed to the right end of the third shaft 16, meshes with a final driven gear 48 that is provided on a differential gear 47. The third shaft 16 is supported in the casing via a bearing 49 that is provided on the outer periphery of the sleeve 32 and a bearing 50 that is provided on the outer periphery of the third shaft 16.

The structure of the toroidal type continuously variable transmission T is explained below.

The input shaft 13 of the toroidal type continuously variable transmission T is connected to the crankshaft 11 of the engine E via the damper 12 of the crank shaft 11, and supports a first continuously variable transmission mechanism 61a and a second continuously variable transmission mechanism 61b that have a substantially identical structure. The first continuously variable transmission mechanism 61a includes an approximately cone-shaped input disc 62 that is fixed to the input shaft 13, an approximately cone-shaped output disc 63 supported on the input shaft 13 in a relatively rotatable manner, and a pair of power rollers 66. The power rollers 66 are supported rotatably around a roller axis 64 and supported tiltably around trunnion axes 65 so as to be in contact with the above-mentioned input disc 62 and output disc 63. Surfaces of the input disc 62 and the output disc 63 that are opposite each other have a toroidal curvature. When the power rollers 66 tilt around the trunnion axes 65, the points of contact of the power rollers 66 with the input disc 62 and the output disc 63 change.

The second continuously variable transmission mechanism 61b is positioned substantially symmetrically to the first continuously variable transmission mechanism 61a relative to the plane of the output gear 25.

When the power rollers 66 tilt in the direction of the arrows a, since the points of contact with the input discs 62 move radially outward relative to the input shaft 13 and the points of contact with the output discs 63 move radially inward relative to the input shaft 13, the rotation of the input discs 62 is transmitted to the output discs 63 in an increased manner; and thereby the ratio of the toroidal type continuously variable transmission T changes continuously toward the OD side. On the other hand, when the power rollers 66 tilt in the direction of the arrows b, since the points of contact with the input discs 62 move radially inward relative to the input shaft 13 and the points of contact with the output discs 63 move radially outward relative to the input shaft 13, the rotation of the input discs 62 is transmitted to the output discs 63 in a decreased manner; and thereby the ratio of the toroidal type continuously variable transmission T changes continuously toward the LOW side.

Figure 3:
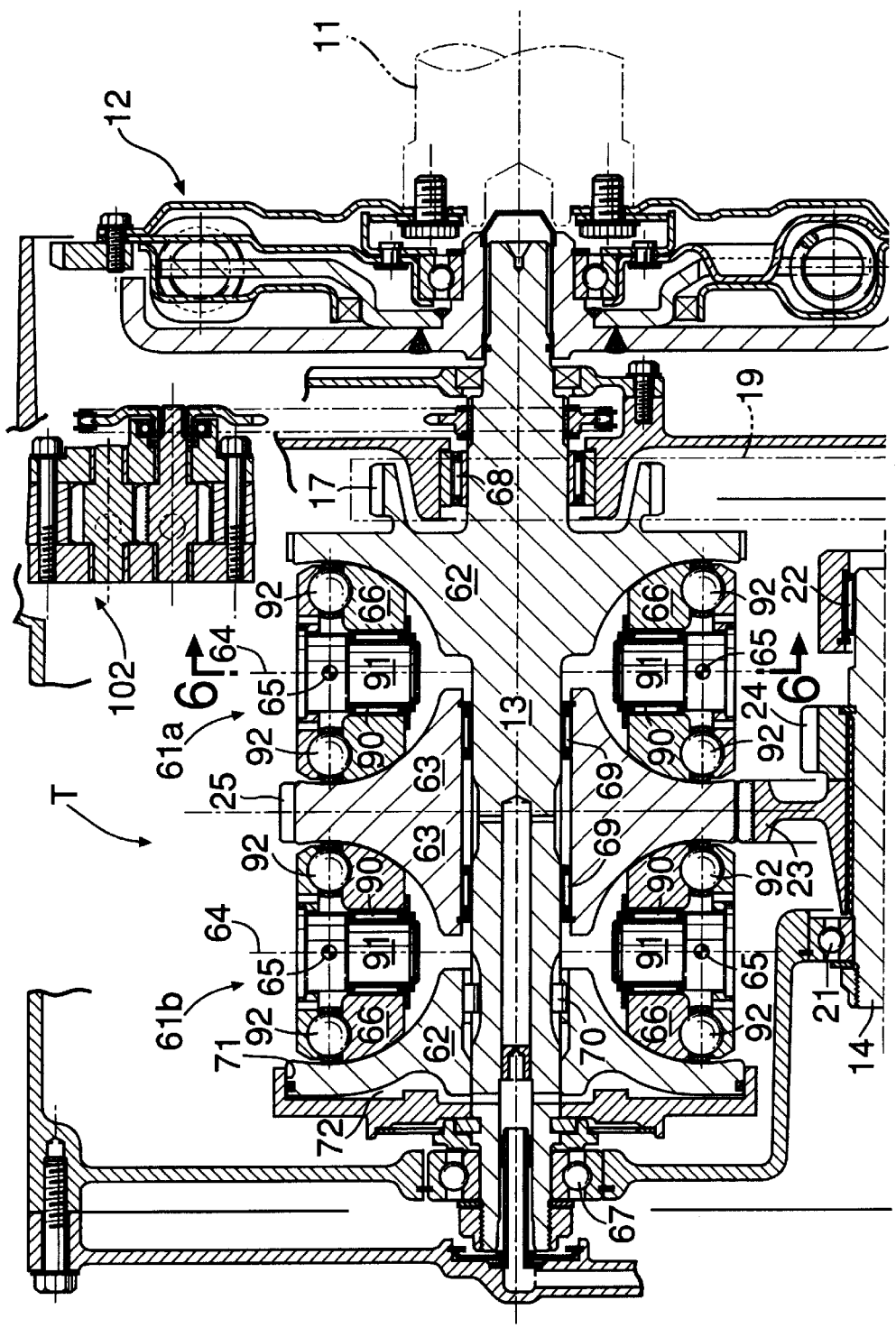
Figure 6:
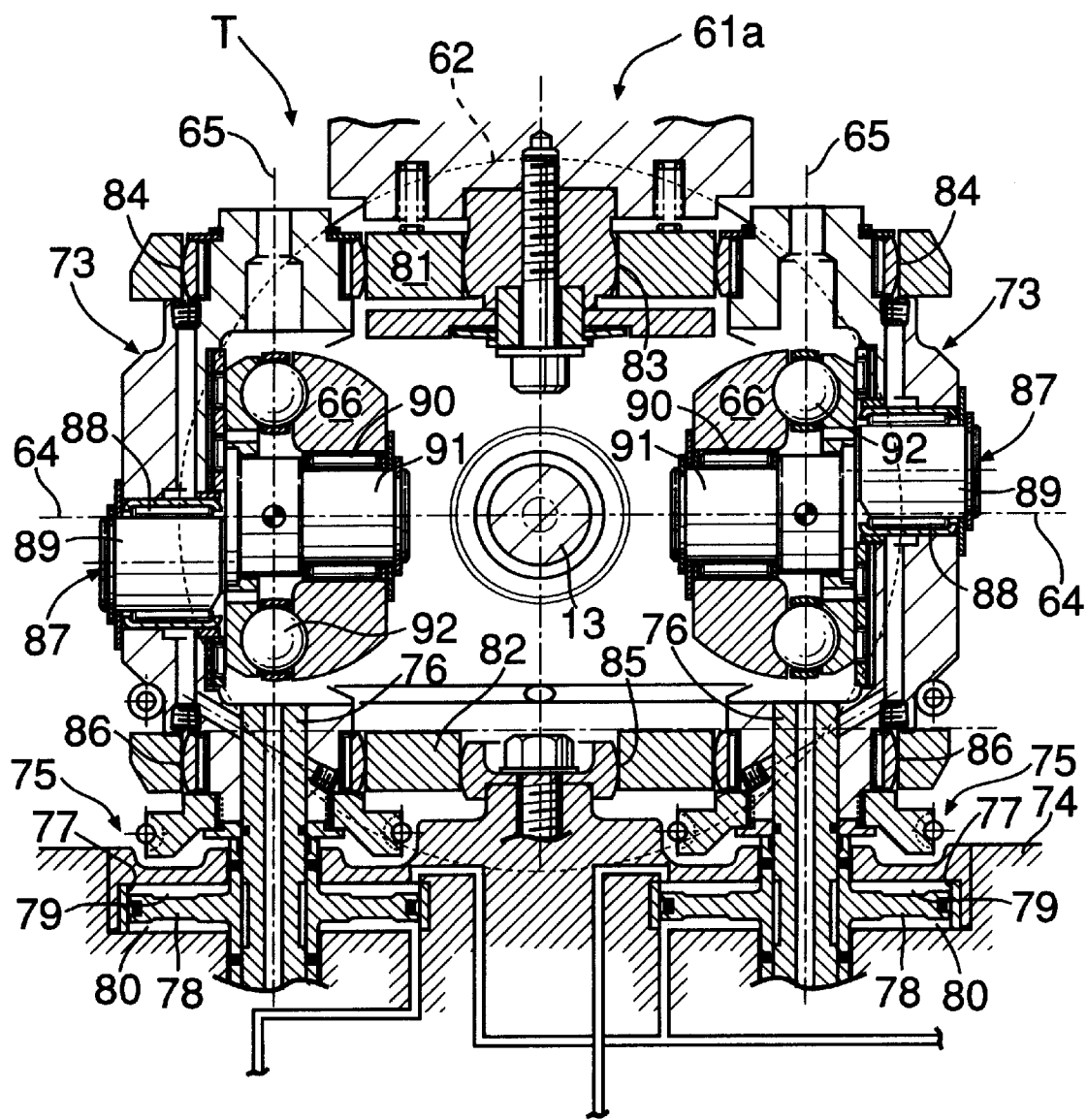
Figure 7:
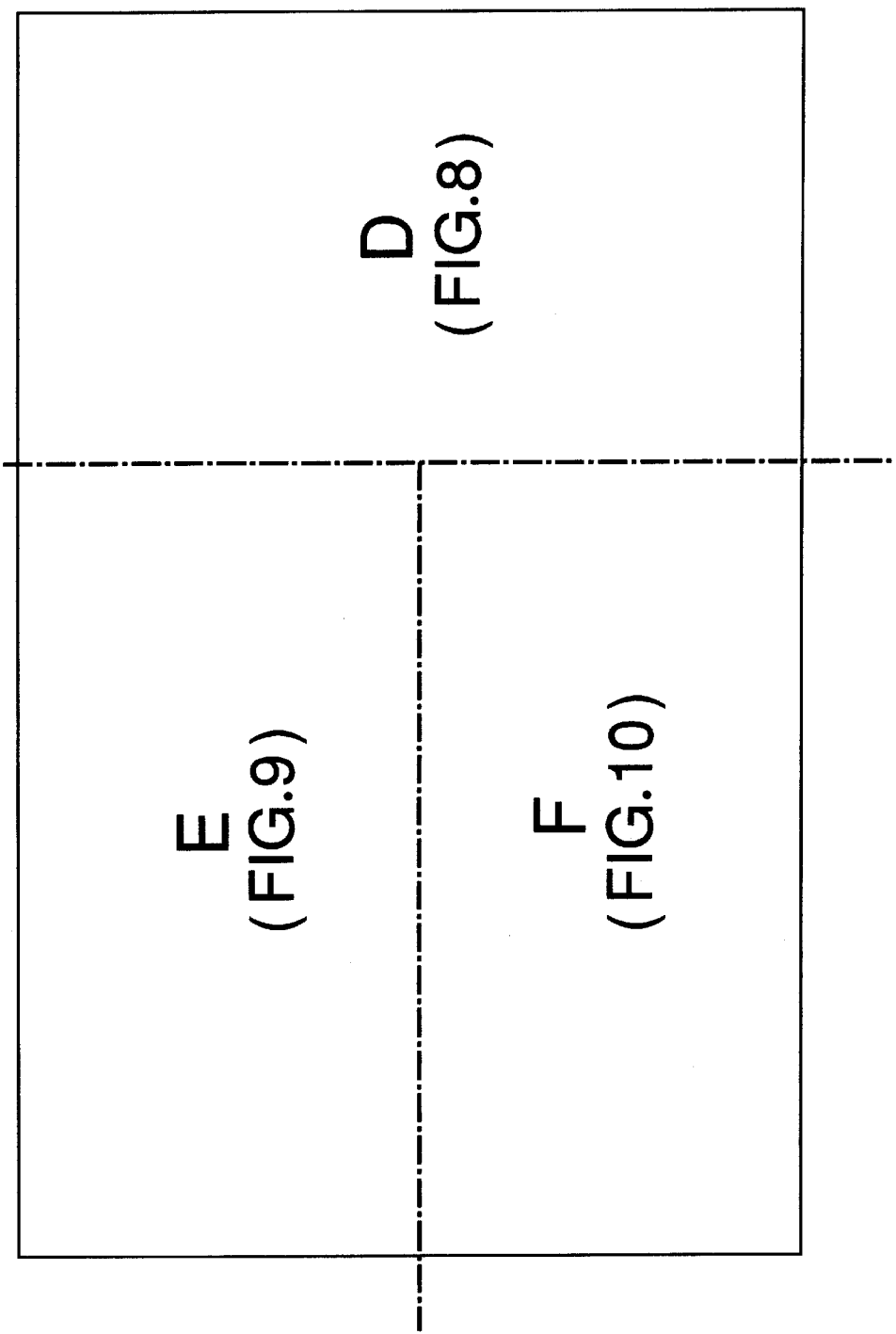

The structure of the toroidal type continuously variable transmission T is explained below in further detail by reference to FIGS. 3 and 6.

The input disc 62 of the first continuously variable transmission mechanism 61a is formed integrally with the input shaft 13 supported in the casing by a pair of bearings 67 and 68. The output discs 63 of the first and second continuously variable transmission mechanisms 61a and 61b are formed integrally with each other and are supported on the input shaft 13 via bearings 69 in a relatively rotatable and axially slidable manner. The input disc 62 of the second continuously variable transmission mechanism 61b is supported on the input shaft 13 via a roller spline 70 in a relatively non-rotatable and axially slidable manner. A cylinder 71 is provided coaxially on the left end of the input shaft 13. An oil chamber 72 is formed between the cylinder 71 and the input disc 62 of the second continuously variable transmission mechanism 61b, the input disc 62 being slidably fitted within the cylinder 72. When a hydraulic pressure is supplied to the oil chamber 72, the input disc 62 of the second continuously variable transmission mechanism 61b and the output discs 63 of the first and second continuously variable transmission mechanisms 61a and 61b are therefore pressed toward the input disc 62 of the first continuously variable transmission mechanism 61a; and it is thus possible to generate a load that suppresses slip between the power rollers 66 and the input discs 62 and output discs 63.

Right and left trunnions 73, which support the pair of power rollers 66, are positioned with the input shaft 13 interposed therebetween. Piston rods 76 of right and left hydraulic actuators 75 provided in a hydraulic control block 74 are connected to the corresponding lower ends of the above-mentioned trunnions 73. The hydraulic actuators 75 include cylinders 77, which are formed in the hydraulic control block 74, pistons 78, which are fitted slidably in the cylinders 77 and connected to the above-mentioned piston rods 76, upper oil chambers 79, which are formed above the pistons 78, and lower oil chambers 80, which are formed below the pistons 78.

The piston rods 76 are provided coaxially with the trunnion axes 65, and the trunnions 73 can therefore tilt around the trunnion axes 65 with the piston rods 76 functioning as support shafts. When a hydraulic pressure is supplied to the lower oil chamber 80 of the left-hand hydraulic actuator 75, a hydraulic pressure is also supplied to the upper oil chamber 79 of the right-hand hydraulic actuator 75. As a result, the right and left piston rods 76 are driven in directions opposite to each other, and when one of the right and left trunnions 73 ascends along the trunnion axis 65, the other one descends along the trunnion axis 65.

In order to reliably synchronize the vertical movement of the right and left trunnions 73, they are connected at their upper ends by an upper yoke 81 and at their lower ends by a lower yoke 82. That is, a middle section of the upper yoke 81 is pivotably supported on the hydraulic control block 74 in a tiltable manner via a ball joint 83, and the right and left ends of the upper yoke 81 are pivotably supported on upper ends of the right and left trunnions 73 in a tiltable and rotatable manner via ball joints 84. In addition, a middle section of the lower yoke 82 is pivotably supported on the hydraulic control block 74 in a tiltable manner via a ball joint 85; and the right and left ends of the lower yoke 82 are pivotably supported on lower ends of the right and left trunnions 73 in a tiltable and rotatable manner via ball joints 86.

Pivot shafts 87 that support the power rollers 66 on the trunnions 73 include trunnion supports 89 that are rotatably supported in the trunnions 73 via bearings 88 and power roller supports 91 that rotatably support the power rollers 66 via bearings 90. With regard to one of the pivot shafts 87, the trunnion support 89 is eccentric downward relative to the power roller support 91; and with regard to the other of the pivot shafts 87, the trunnion support 89 is eccentric upward relative to the power roller support 91. Bearings 92 are placed between the power rollers 66 and the trunnions 73 so as to allow smooth movement of the power rollers 66 relative to the trunnions 73. When the right and left trunnions 73 move in directions opposite to each other, the power rollers 66 tilt in the directions shown by arrows a and b in FIG. 1 around the trunnion axes 65 together with the trunnions 73 due to the reaction forces arising from the input disc 62 and the output disc 63, and the ratios of the first and second continuously variable transmission mechanisms 61a and 61b continuously change in synchronism with each other.

Figure 8:
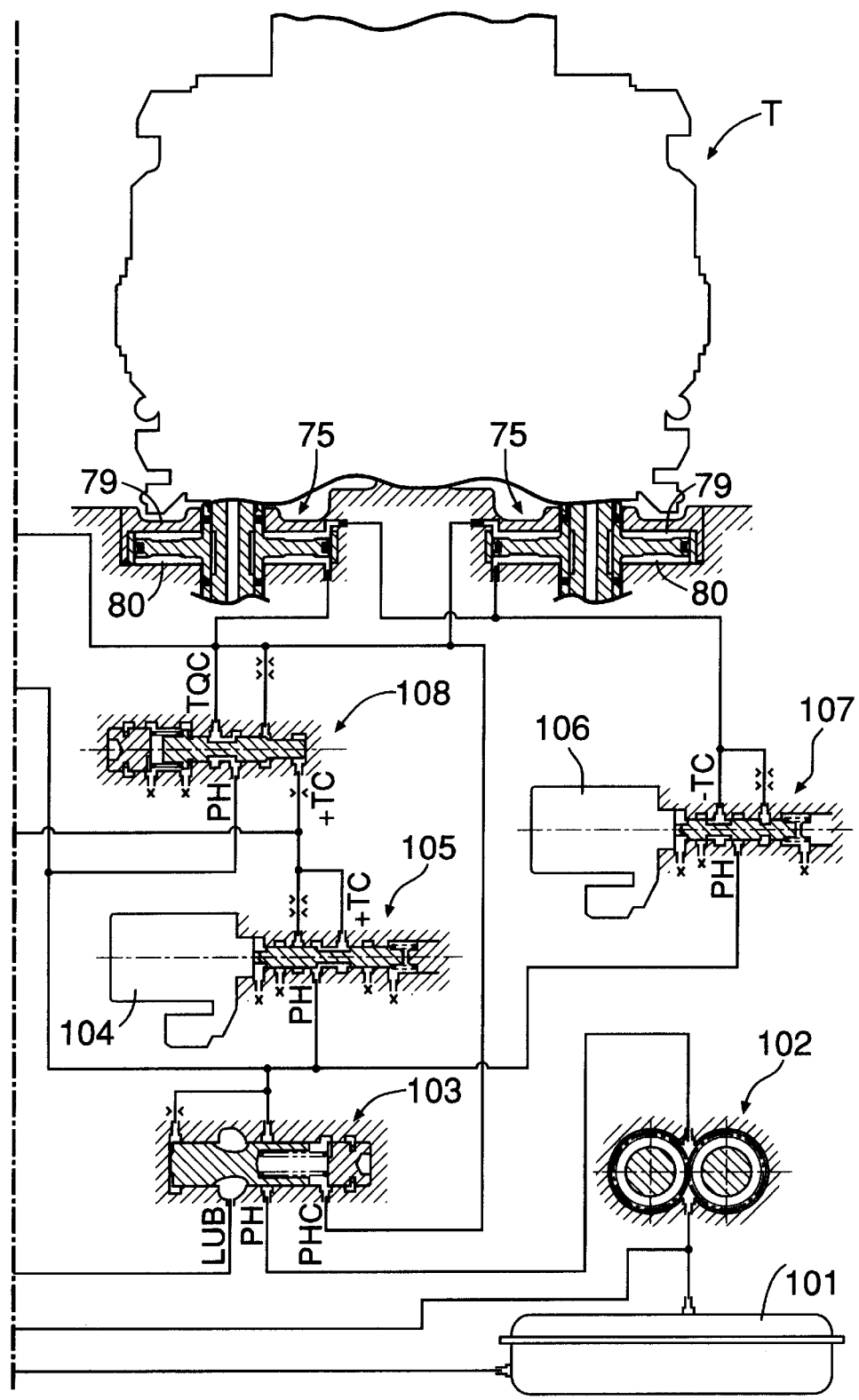
Figure 9:
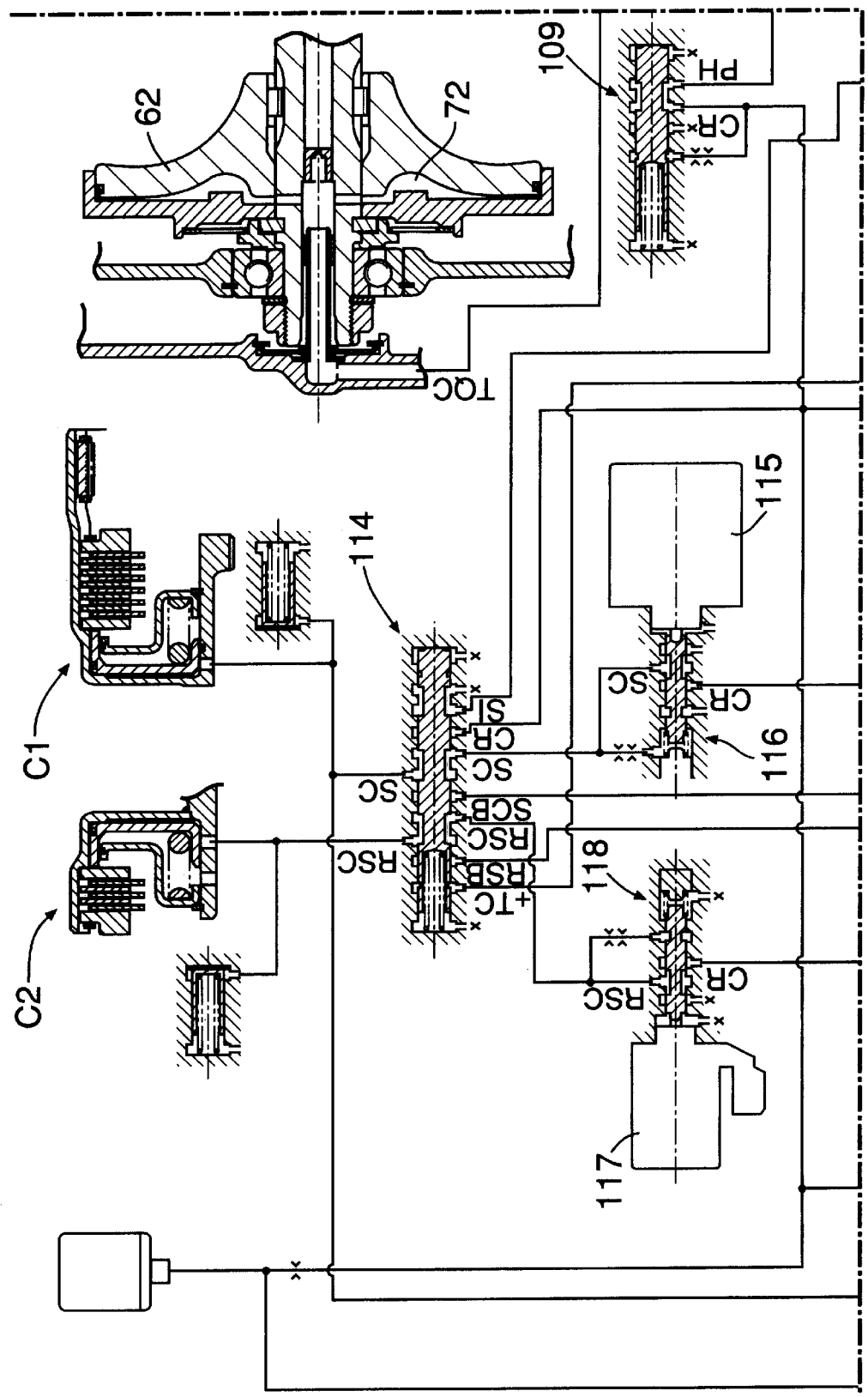
Figure 10:
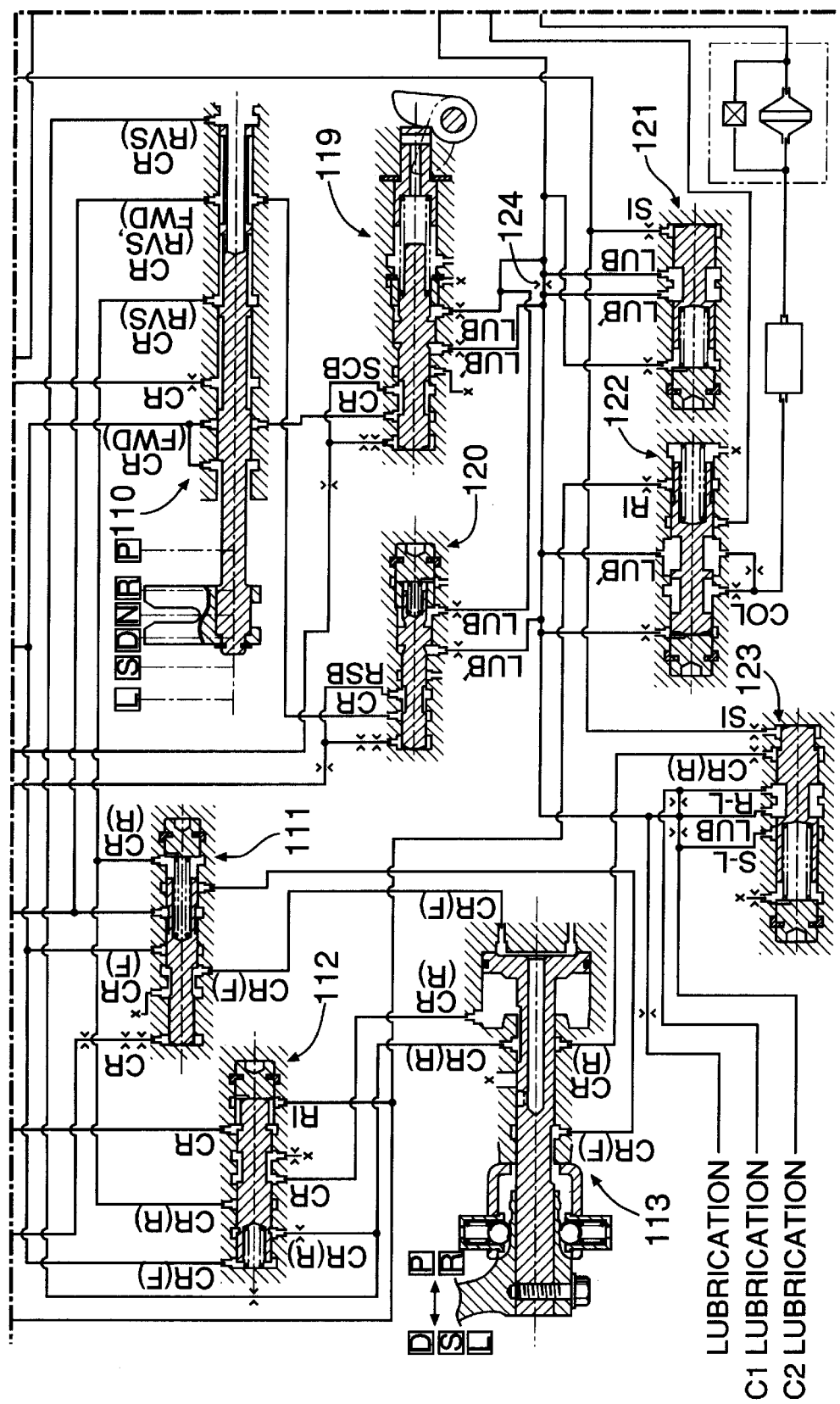
Figure 11A:
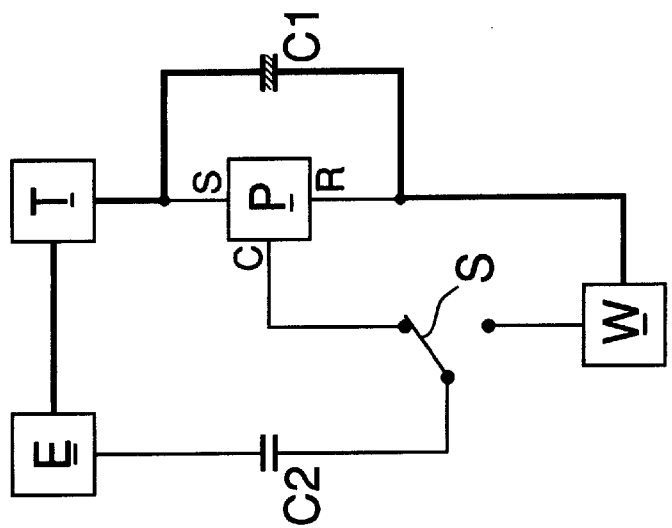
FIGS. 11A to 11C are diagrams for explaining a power transmission route when the continuously variable transmission system operates at normal conditions.
Figure 11B:
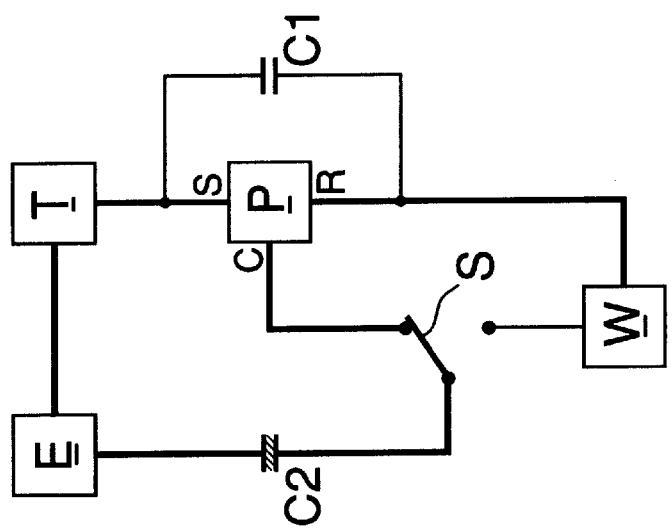
Figure 11C:
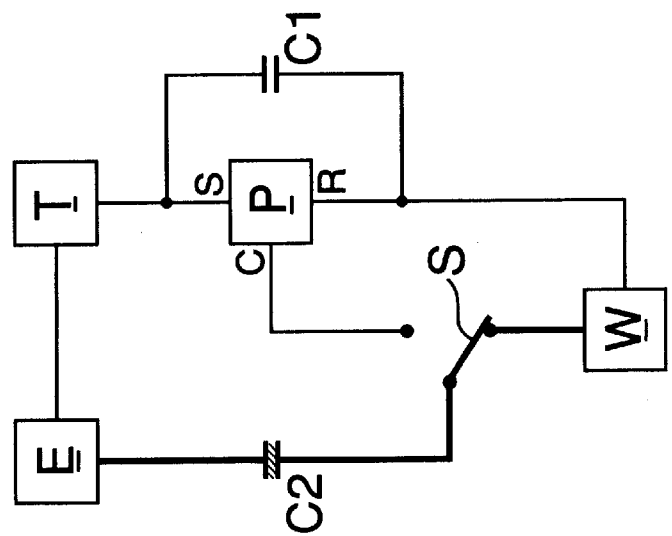
Figure 12A:
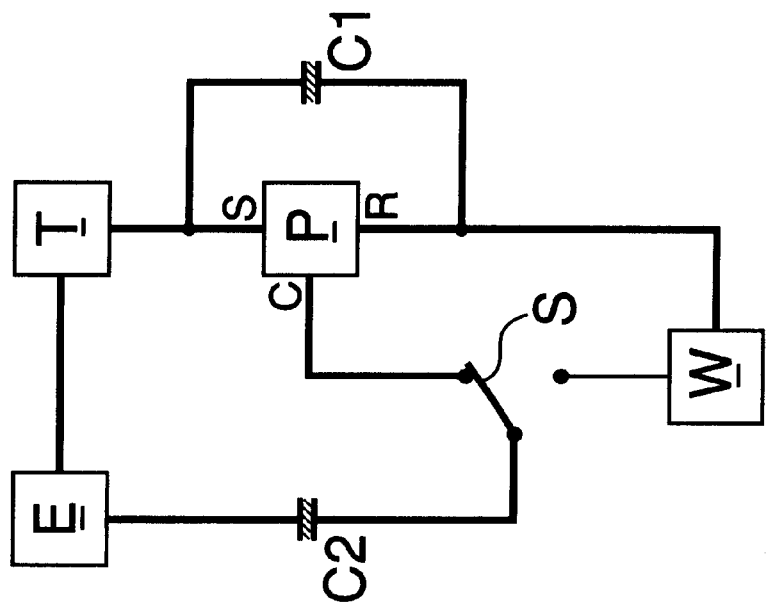
FIGS. 12A and 12B are diagrams for explaining a power transmission route when the continuously variable transmission system fails.
Figure 12B:
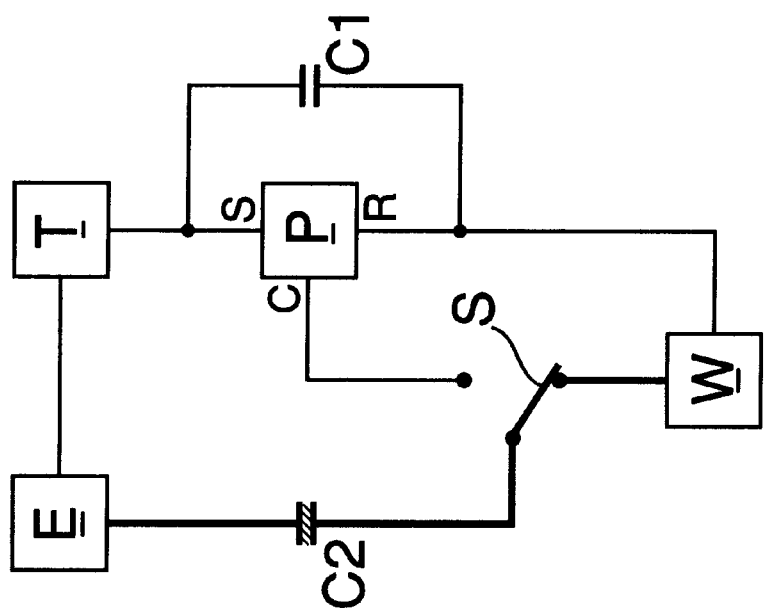

The arrangement of the hydraulic control circuit for controlling the continuously variable transmission system is now explained by reference to FIGS. 8 to 10.

The hydraulic control circuit includes an oil tank 101, an oil pump 102, a PH regulator valve 103, a +TC valve 105 that is operated by an electronically controlled solenoid 104, a −TC valve 107 that is operated by an electronically controlled solenoid 106, a TQ control valve 108, a CLCH reducing valve 109, a manual valve 110, a D-INH valve 111, an RVS CPC valve 112, a servo valve 113, a shift inhibitor valve 114, an SC control valve 116 that is operated by an electronically controlled solenoid 115, an RVS SCC valve 118 that is operated by an electronically controlled solenoid 117, an SC back up valve 119, an RSC back up valve 120, an SC shift valve 121, a lubrication valve 122 and an SCLUB shift valve 123.

The actions of the continuously variable transmission system having the above-mentioned arrangement are explained below for each of the cases where the vehicle travels forward at normal conditions (no failure), where the vehicle reverses at normal conditions (no failure), where the vehicle travels forward when a failure has occurred and where the vehicle reverses when a failure has occurred.

(1) When the Vehicle Travels Forward at Normal Conditions

Firstly, control of the speed change of the toroidal type continuously variable transmission T is explained. A pressure PH obtained by adjusting the pressure discharged from the oil pump 102 by means of the PH regulator valve 103 is converted by the +TC valve 105, which is operated by the electronically controlled solenoid 104, and the TQ control valve 108 into a pressure TQC and is converted by the −TC valve 107, which is operated by the electronically controlled solenoid 106, into a pressure −TC. The high pressure TQC acts on the lower oil chamber 80 of the left-hand hydraulic actuator 75 of the toroidal type continuously variable transmission T and the upper oil chamber 79 of the right-hand hydraulic actuator 75 thereof while the pressure −TC acts on the upper oil chamber 79 of the left-hand hydraulic actuator 75 of the toroidal type continuously variable transmission T and the lower oil chamber 80 of the right-hand hydraulic actuator 75 thereof. The pressure TQC also acts on the oil chamber 72 of the toroidal type continuously variable transmission T (see FIG. 3), thereby producing a thrust in the axial direction and preventing slip of the power rollers 66.

When a torque of the engine E is applied to the toroidal type continuously variable transmission T, loads that drag the power rollers 66 in the direction of rotation of the input discs 62 are generated, thereby attempting to tilt the power rollers 66 in a direction in which the ratio decreases. However, the difference between the pressure TQC and the pressure −TC drives the pistons 78 of the hydraulic actuators 75, thereby generating loads in the opposite direction so as to counteract the above-mentioned loads. If the loads generated by the hydraulic actuators 75 are greater than the loads generated by the torque of the engine E, the ratio of the toroidal type continuously variable transmission T changes toward the OD side. If the loads generated by the torque of the engine E are greater than the loads generated by the hydraulic actuators 75, the ratio of the toroidal type continuously variable transmission T changes toward the LOW side. By controlling the duty ratio of the pair of electronically controlled solenoids 104 and 106, the ratio of the toroidal type continuously variable transmission T can thus be made to vary between a LOW ratio (2.415 in the present embodiment) and an OD ratio (0.415 in the present embodiment).

When a selector is positioned in a D range in order to move the vehicle forward, since the spool of the manual valve 110 moves leftward, a pressure CR obtained by reducing the pressure PH by means of the CLCH reducing valve 109 is transmitted from a CR port of the manual valve 110 via a CR(FWD) port to both a CR(F) port of the D-INH valve 111 and a CR(F) port of the RVS CPC valve 112. As a result, since the spool of the RVS CPC valve 112 is maintained at a rightward position as shown in the figure, a CR port connected to the CLCH reducing valve 109 is cut off, and a CR(R) port of the servo valve 113 is open to the air. Meanwhile, since a first clutch pressure SC for engaging the first clutch C1 is transmitted to a CR port of the D-INH valve 111 via the route described below, the spool of the D-INH valve 111 moves rightward. As a result, its CR(F)

port communicates with a CR(F) port of the servo valve 113, the spool moves leftward, and the shifter S is switched over to the forward side (the direction of arrow F in FIG. 1).

Since the spool of the shift inhibitor valve 114 is normally at the rightward position shown in the figure, the pressure CR discharged from the CR(FWD) port of the manual valve 110 can be adjusted to the pressure SC by the SC control valve 116, which is operated by the electronically controlled solenoid 115, thereby engaging the first clutch C1. Since the pressure CR discharged from a CR(F) port of the servo valve 113 is also transmitted to the CR port of the RVS SCC valve 118, the pressure CR is adjusted to a pressure RSC by the RVS SCC valve 118 that is operated by the electronically controlled solenoid 117, whereby the second clutch C2 can thus be engaged. As described above, the pressure SC is transmitted to the CR port of the D-INH valve 111, thereby moving its spool rightward.

Figure 13A:
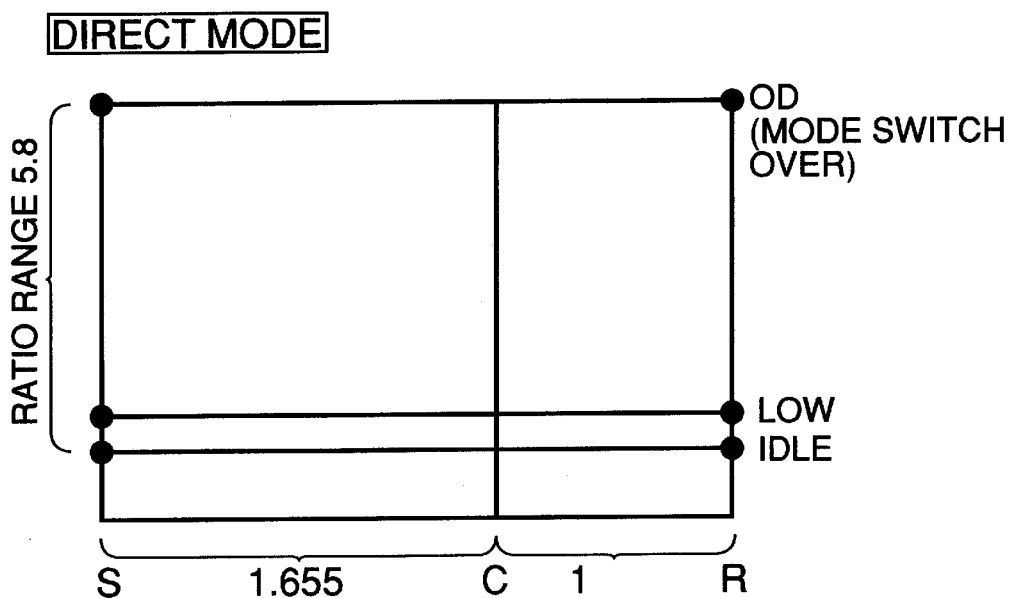
FIGS. 13A and 13B are graphs of the speed of a planetary gear train.

When the vehicle travels forward when the situation is normal, the vehicle is started with the toroidal type continuously variable transmission T at the LOW ratio and is accelerated until the ratio reaches the OD ratio. This travel mode is called the direct mode. The power transmission route in this case is shown by the bold line in FIG. 11A, and a graph of the speed of the planetary gear train P is shown in FIG. 13A. In this direct mode the first clutch C1 alone is engaged while the second clutch C2 is maintained in a disengaged state. That is, in FIGS. 1 and 4, when the first clutch C1 is engaged, the ring gear 40 and the sun gear 39 are unified to lock the planetary gear train P, and the torque of the engine E is transmitted to the driven wheels W via the toroidal type continuously variable transmission T and the first clutch C1. More specifically, the torque of the engine E is transmitted to the driven wheels W via a route including the crankshaft 11, the damper 12, the input shaft 13 of the toroidal type continuously variable transmission T, the output gear 25 of the toroidal type continuously variable transmission T, the first helical gear 23, the second helical gear 24, the third helical gear 27, the sleeve 26, the first clutch C1, the third shaft 16, the final drive gear 46, the final driven gear 48, and the differential gear 47, in that order, thereby driving the vehicle forward.

During this period, although rotation of the carrier 41 of the planetary gear train P is transmitted to the clutch inner 38 of the second clutch C2 via the sleeve 32, the fifth helical gear 33, the fourth helical gear 31, the sleeve 30, the shifter S, and the second shaft 15, in that order. Since the second clutch C2 is in a disengaged state, the clutch inner 38 of the second clutch C2 does not impede the clutch outer 20 thereof which is connected to the input shaft 13 via the driven sprocket 18, the endless chain 19, and the drive sprocket 17.

After the first clutch C1 is completely engaged, by controlling the duty ratio of the pair of electronically controlled solenoids 104 and 106 based on the rotational rate of the engine, the vehicle speed, the degree of opening of the throttle, etc., the vehicle is accelerated as the ratio of the toroidal type continuously variable transmission T is changed from LOW to OD. The ratio range during this period is 5.8, which is the ratio of the LOW ratio (2.415) to the OD ratio (0.415) of the toroidal type continuously variable transmission T.

Figure 13B:
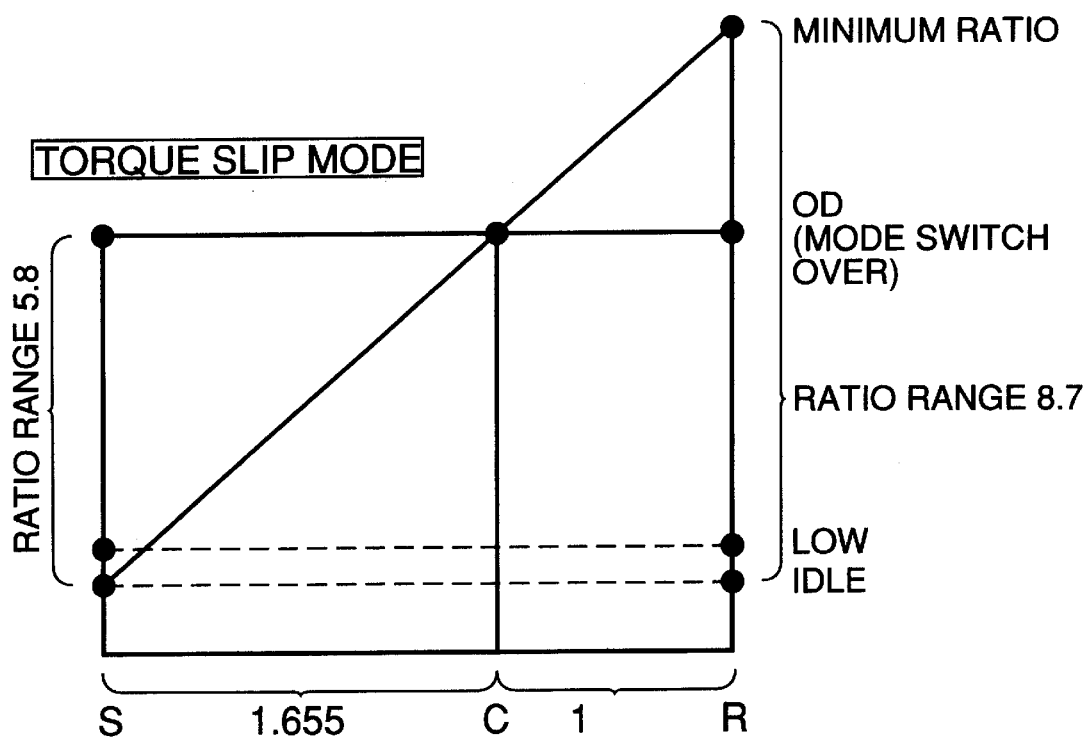

When the toroidal type continuously variable transmission T reaches the OD ratio, the duty ratio of the electronically controlled valve 115 of the SC control valve 116 to the electronically controlled valve 117 of the RVS SCC valve 118 is controlled so as to disengage the first clutch C1 that has been in an engaged state and engage the second clutch C2 that has been in a disengaged state. Furthermore, by controlling the duty ratio of the electronically controlled solenoids 104 and 106, the ratio of the toroidal type continuously variable transmission T is changed from OD to LOW. In this way, the overall ratio of the continuously variable transmission system can be increased beyond the OD ratio which is the maximum ratio for the toroidal type continuously variable transmission T alone, and the ratio range in the direct mode can be increased from 5.8 to 8.7. This travel mode is called a torque split mode. The power transmission route in this case is shown by the bold line in FIG. 11B, and a graph of the speed of the planetary gear train P is shown in FIG. 13B.

In the torque split mode, the torque of the engine E is transmitted to the carrier 41 of the planetary gear train P via a route including the crankshaft 11, the damper 12, the input shaft 13 of the toroidal type continuously variable transmission T, the drive sprocket 17, the endless chain 19, the driven sprocket 18, the clutch outer 20 of the second clutch C2, the clutch inner 38 of the second clutch C2, the second shaft 15, the shifter S, the sleeve 30, the fourth helical gear 31, the fifth helical gear 33, and the sleeve 32, in that order. A majority of the torque that has been transmitted to the carrier 41 of the planetary gear train P is transmitted to the driven wheels W by a route including the ring gear 40, the clutch outer 44 of the first clutch C1, the third shaft 16, the final drive gear 46, the final driven gear 48, and the differential gear 47, in that order, thereby driving the vehicle forward. A portion of the torque that has been transmitted to the carrier 41 of the planetary gear train P is transmitted back to the input shaft 13 of the toroidal type continuously variable transmission T via a route including the sun gear 39 of the planetary gear train P, the sleeve 26, the third helical gear 27, the second helical gear 24, the first helical gear 23, and the output gear 25, in that order, and from there to the driven wheels W via the above-mentioned route including the second clutch C2.

When the toroidal type continuously variable transmission T is shifted from the OD ratio side to the LOW ratio side in this torque split mode, the overall ratio of the continuously variable transmission system further increases. This is because when the toroidal type continuously variable transmission T is in the LOW ratio and the rotation of the output gear 25 decreases, the rotation of the ring gear 40 of the planetary gear train P that is connected to the output gear 25 decreases, and the rotation of the sun gear 40 of the planetary gear train P that is connected to the driven wheels W increases accordingly.

When the vehicle starts to travel forward, the load on the first clutch C1 that functions as a starting clutch increases. In order to cool the first clutch C1 by supplying it with a sufficient amount of oil, oil that is discharged from a LUB port of the PH regulator valve 103 is supplied to a section of the first clutch C1 that is to be lubricated via a LUB port and a LUB' port of the SC shift valve 121 and further a LUB port and an R-L port of the SC-LUB shift valve 123.

(2) When the Vehicle Reverses at Normal Conditions

When the selector is positioned in an R range in order to reverse the vehicle, since the spool of the manual valve 110 moves rightward, the pressure CR obtained by reducing the pressure PH by means of the CLCH reducing valve 109 is transmitted to a CR(R) port of the D-INH valve 111 via the CR port and then a CR(RVS) port of the manual valve 110, thereby moving the spool of the D-INH valve 111 leftward. The pressure CR discharged from the CLCH reducing valve 109 is also transmitted to the CR port of the RVS CPC valve 112, thereby moving the spool thereof leftward. As a result, the pressure CR that has been input into a CR(R) port of the RVS CPC valve 112 is input into a CR(R) port of the servo valve 113, and the spool of the servo valve 113 consequently moves rightward, thereby switching over the shifter S to the reverse side (the direction of arrow R in FIG. 1).

Part of the pressure CR output from a CR(R) port of the servo valve 113 is transmitted to a CR(R) port of the SC-LUB shift valve 123, thereby moving the spool thereof leftward. The remainder of the pressure CR output from the CR(R) port of the servo valve 113 is transmitted to a CR port of the RVS SCC valve 118 which is operated by the electronically controlled solenoid 117, via a CR(RVS) port and a CR(RVS, FWD) port of the manual valve 110, and becomes an initial pressure for the pressure RSC that operates the second clutch C2.

When the vehicle reverses at normal conditions, the vehicle is started in a state in which the toroidal type continuously variable transmission T is in the LOW ratio. At this point, the first clutch C1 is maintained in a disengaged state and the second clutch C2 alone is engaged. The power transmission route in this case is shown by the bold line in FIG. 1C.

Figure 4:
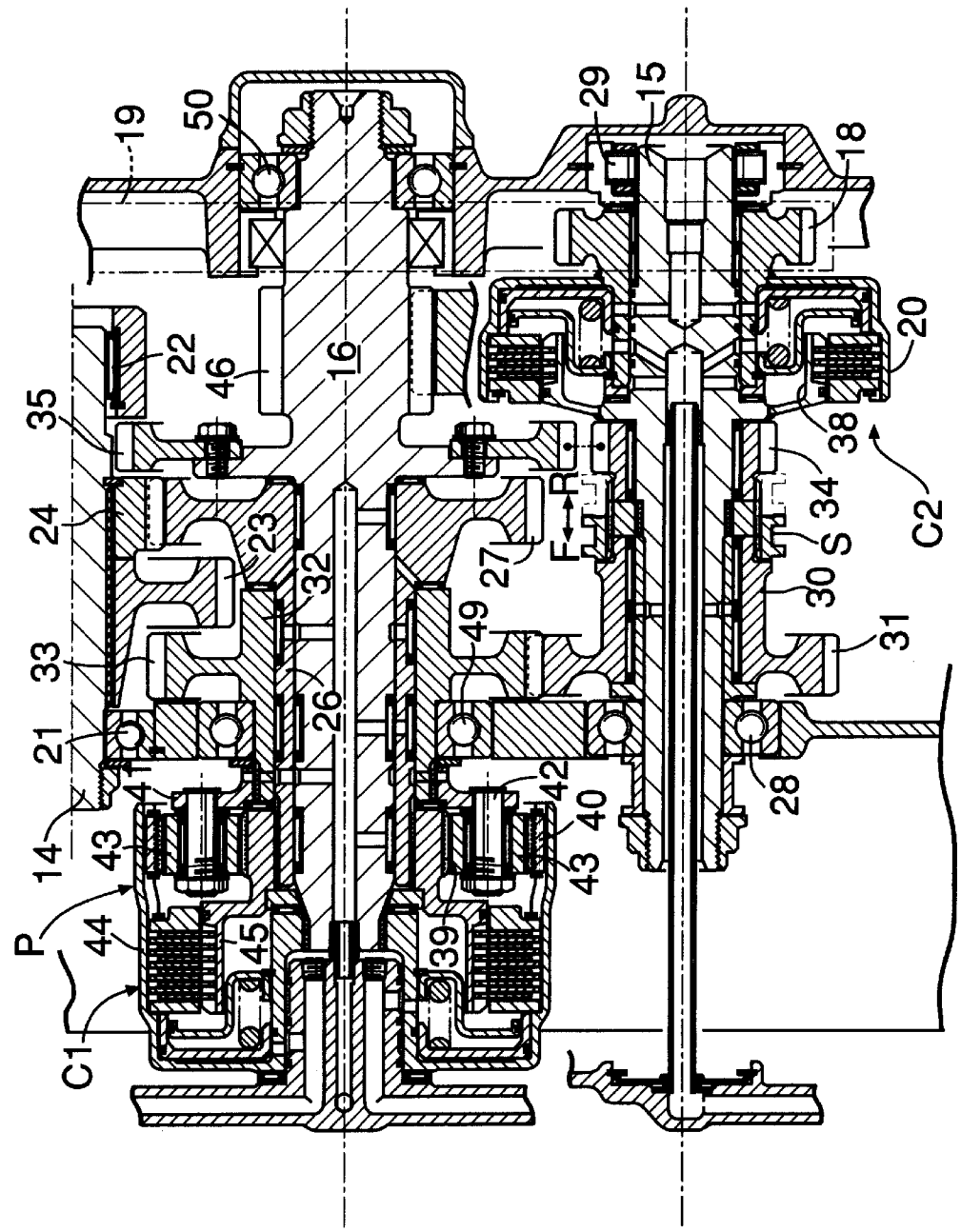
Figure 5:
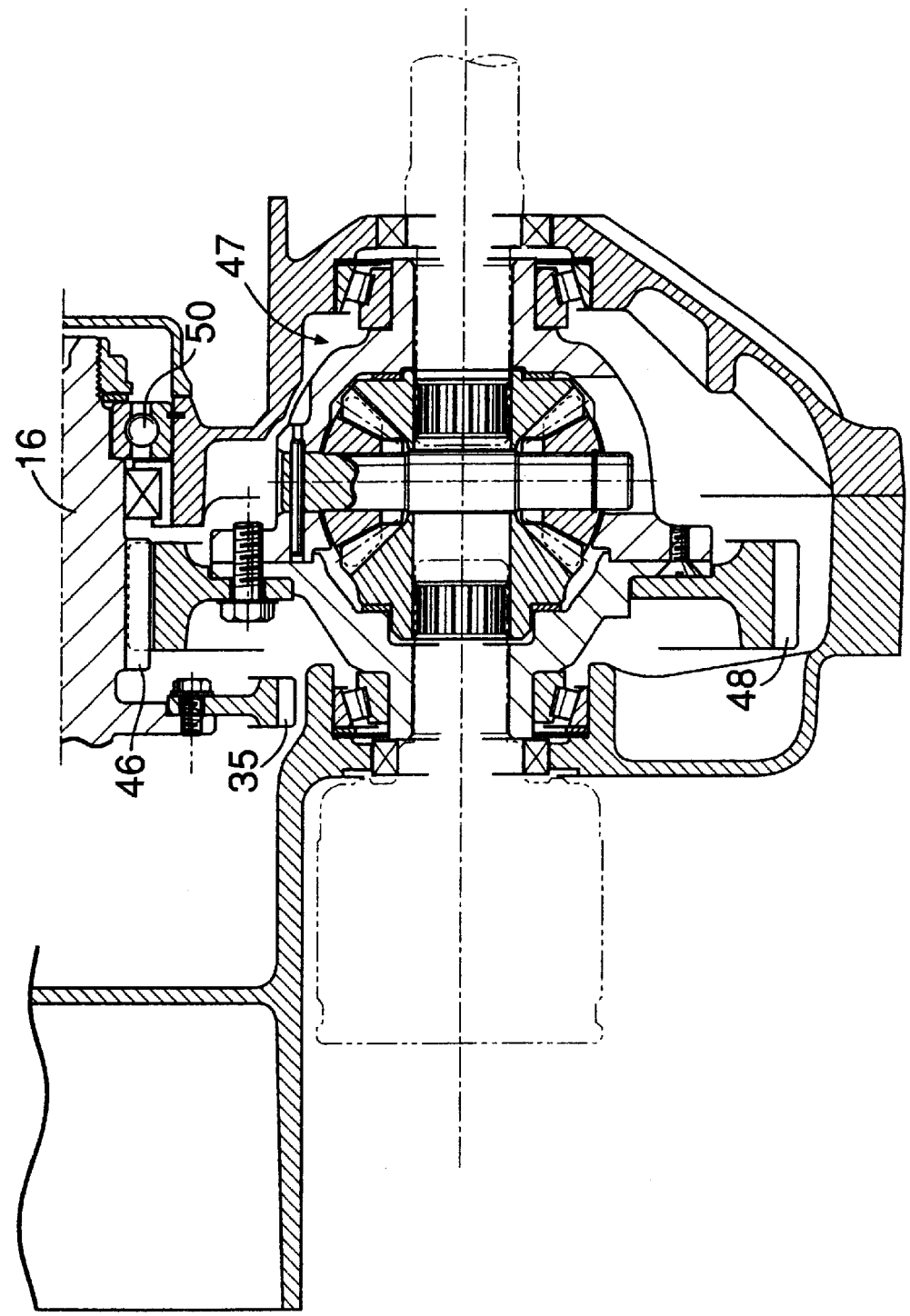

That is, in FIGS. 1 and 4, when the second clutch C2 is engaged, the torque of the engine E is transmitted to the driven wheels W via a route including the crankshaft 11, the damper 12, the input shaft 13 of the toroidal type continuously variable transmission T, the drive sprocket 17, the endless chain 19, the driven sprocket 18, the second clutch C2, the second shaft 15, the shifter S, the sixth helical gear 34, the eighth helical gear 36, the seventh helical gear 35, the third shaft 16, the final drive gear 46, the final driven gear 48, and the differential gear 47, in that order, thereby reversing the vehicle. During this period, rotation of the output gear 25 of the toroidal type continuously variable transmission T is input into the sun gear 39 of the planetary gear train P, output from the carrier 41 and transmitted to the sleeve 30 of the second shaft 15, but does not impede rotation of the second shaft 15 since the shifter S is switched over to the reverse side.

The torque of the engine E is thereby transmitted to the driven wheels W via the second clutch C2 without it passing through the toroidal type continuously variable transmission T and the first clutch C1 when the vehicle reverses. When the vehicle starts to reverse the load of the second clutch C2 increases since the second clutch C2 functions as a starting clutch, but as described above, the leftward movement of the spool of the SC-LUB shift valve 123 supplies oil from the LUB port via the S-L port preferentially to a section of the second clutch C2 that is to be lubricated, and cooling is thus achieved.

(3) When the Vehicle Travels Forward When a Failure has Occurred

When the electronic control system of the continuously variable transmission system fails, since the electronically controlled solenoids 104, 106, 115 and 117 cannot function, the above-mentioned control of the ratio of the toroidal type continuously variable transmission T cannot be carried out. In particular, in the case where the electronic control system fails when the vehicle is stationary, a load that changes the ratio of the toroidal type continuously variable transmission T beyond the LOW ratio or a load that changes the ratio beyond the OD ratio is applied to the toroidal type continuously variable transmission T when the vehicle starts, thereby causing a possibility that the durability of the toroidal type continuously variable transmission T might be degraded. Furthermore, if the ratio is fixed at the OD ratio, the torque that is transmitted to the driven wheels W decreases, thereby causing a possibility that the starting performance might be greatly degraded. In this embodiment, the above-mentioned problems are solved by controlling the first clutch C1 and the second clutch C2 as follows in the case where the vehicle travels forward when a failure has occurred.

When the levels of current that are applied to the electronically controlled solenoid 104 of the +TC valve 105 and the electronically controlled solenoid 106 of the −TC valve 107 are 0 because of a failure in the electronic control system, the pressure +TC that is output from the +TC valve 105 is a maximum. When the pressure +TC is transmitted to a +TC port of the shift inhibitor valve 114, the spool thereof moves leftward, the first clutch C1 and the second clutch C2 are disconnected from the SC control valve 116 and the RVS SCC valve 118 respectively and instead connected to the SC back up valve 119 and the RSC back up valve 120 respectively. When the spool of the shift inhibitor valve 114 moves leftward, the pressure CR that is input into the CR port thereof is output as a pressure SI from the SI port thereof, and the SI pressure is transmitted to both the SC shift valve 121 and the SC-LUB shift valve 123, thereby moving their spools leftward.

Figure 14:
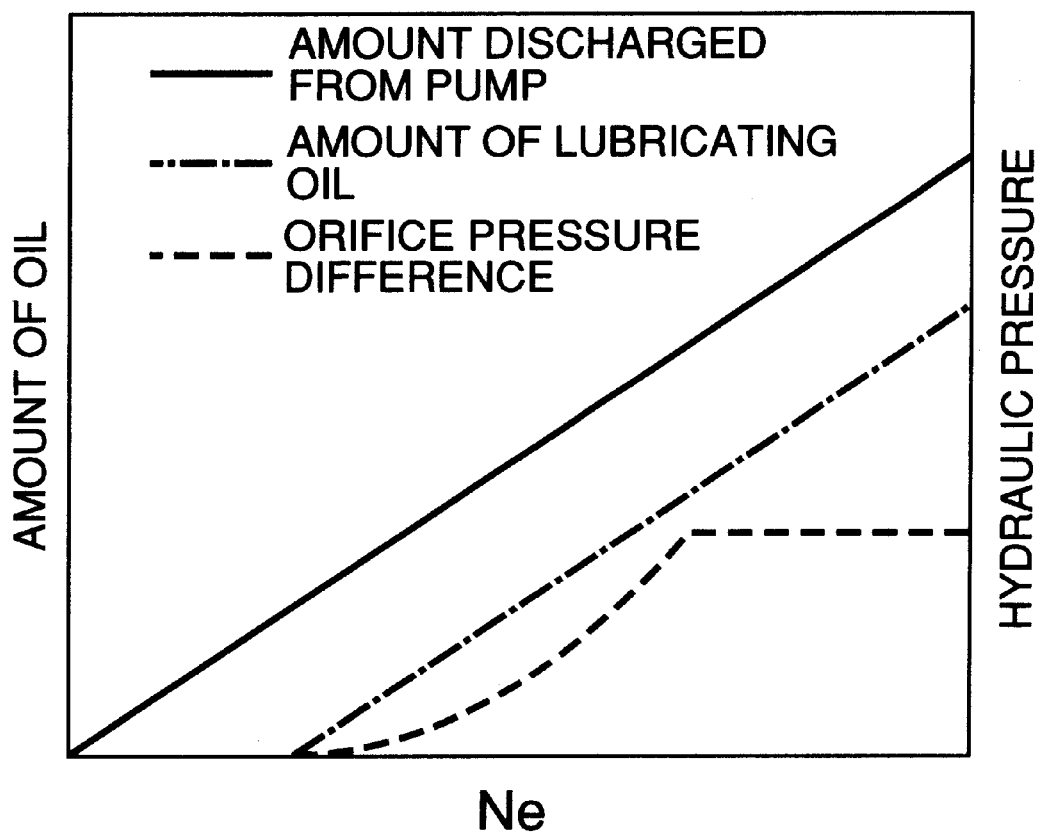

When the spool of the SC shift valve 121 moves leftward, communication between the LUB and LUB' ports thereof is cut off, and the oil that has been passing through the SC shift valve 121 passes through an orifice 124, thereby generating a difference between the pressure before and that after the orifice 124 according to the oil flow rate (the amount discharged from the oil pump 102, related to the rotational rate of the engine). FIG. 14 illustrates the characteristics of changes in the amount discharged from the oil pump 102, the amount of lubricating oil and the difference in pressure before and after the orifice 124 relative to the rotational rate Ne of the engine.

The above-mentioned pressure difference is transmitted to the LUB port and the LUB' port of the SC back up valve 119, thereby adjusting the pressure CR to a pressure RSB related to the rotational rate of the engine, and is also transmitted to the LUB port and the LUB' port of the RSC back up valve 120, thereby adjusting the pressure CR to a pressure RSB related to the rotational rate of the engine. In this case, the spool of the SC back up valve 119 moves leftward according to the tilt angle of the trunnions 73 of the toroidal type continuously variable transmission T (that is, the ratio of the toroidal type continuously variable transmission T) and the pressure SCB that is output by the SC back up valve 119 changes according to both the rotational rate of the engine and this ratio. More specifically, the higher the rotational rate of the engine and the lower the ratio of the toroidal type continuously variable transmission T, the higher the pressure SCB.

Figure 15:
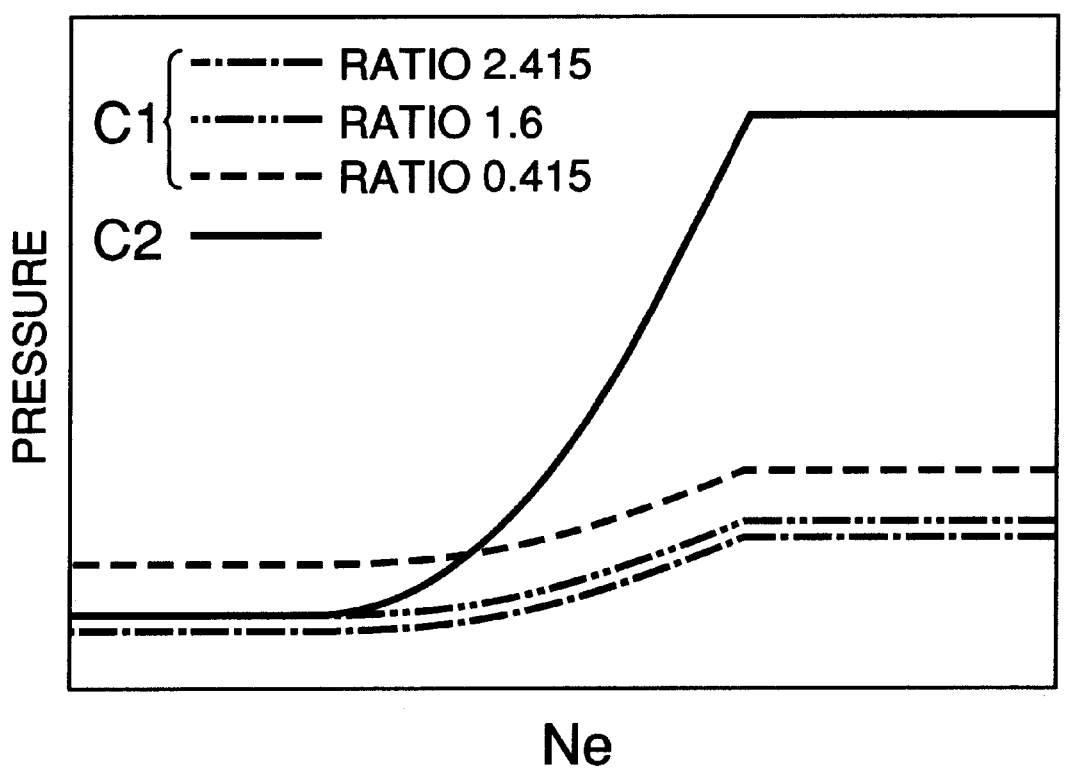
Figure 16:
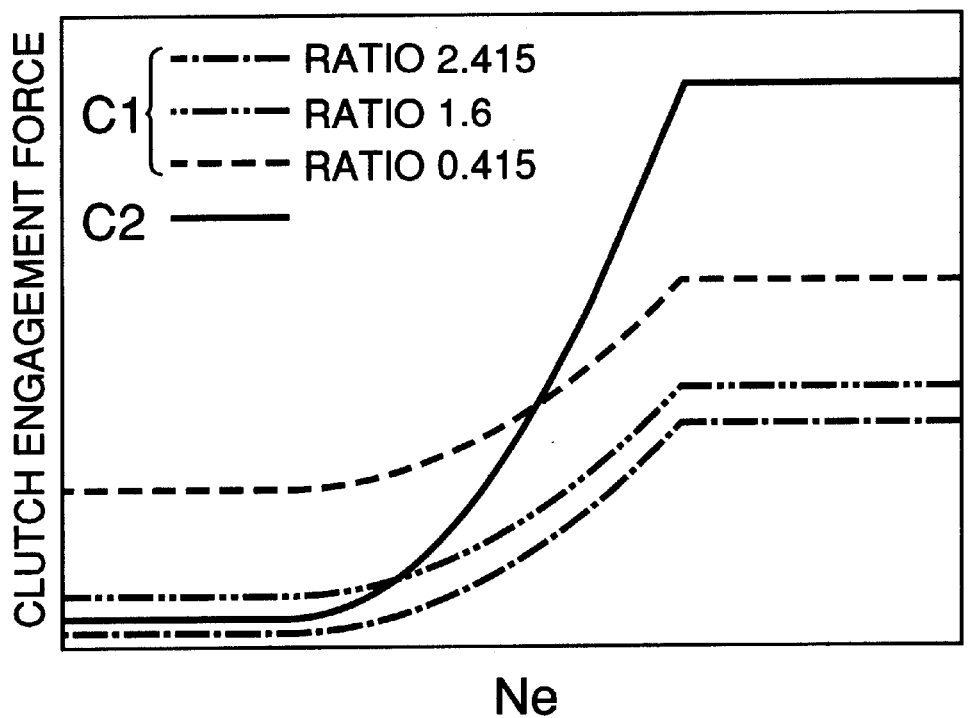

FIG. 15 illustrates the change in hydraulic pressure (pressure RSB) of the second hydraulic clutch C2 relative to the rotational rate Ne of the engine and the changes in hydraulic pressure (pressure SCB) of the first hydraulic clutch C1 relative to the rotational rate Ne of the engine at three ratios (2.415, 1.6 and 0.415). FIG. 16 illustrates the change in engagement force of the second hydraulic clutch C2 relative to the rotational rate Ne of the engine and the changes in engagement force of the first hydraulic clutch C1 relative to the rotational rate Ne of the engine at three ratios (2.415, 1.6 and 0.415). From FIGS. 15 and 16, it can be understood that the higher the rotation rate of the engine and the lower the ratio of the toroidal type continuously variable transmission T, the higher the SCB pressure that is output from the SC back up valve 119, that is, the stronger the engagement force of the first hydraulic clutch C1.

If the difference in rotational rate between the input discs 62 and the output discs 63 of the toroidal type continuously variable transmission T is in the range between the LOW ratio (2.415) and the OD ratio (0.415) when the vehicle starts to travel forward when a failure has occurred, it is possible to prevent an excessive load from being applied to the toroidal type continuously variable transmission T. However, if the first clutch C1 alone is engaged when the vehicle starts to travel forward, since the rotational rate of the ring gear 40 of the planetary gear train P that is connected to the stationary driven wheels W is 0, the sun gear 39 connected to the output gear 25 of the toroidal type continuously variable transmission T is braked due to it being restrained by the ring gear 40, and the ratio tries to move beyond the LOW ratio, thereby generating a high load. On the other hand, if the second clutch C2 alone is engaged when the vehicle starts to travel forward, since the rotational rate of the ring gear 40 of the planetary gear train P that is connected to the stationary driven wheels W is 0 and the rotation of the carrier 41 connected to the engine E increases, the rotation of the sun gear 39 is transmitted to the output gear 25 at high speed, and the ratio tries to move beyond the OD ratio, thereby causing a high load.

By setting the engagement forces of the first clutch C1 and the second clutch C2 so that a decrease in the rotational rate of the sun gear 39 due to engagement of the first clutch C1 is counterbalanced by an increase in the rotational rate of the carrier 41 due to engagement of the second clutch C2, the ratio of the toroidal type continuously variable transmission T can be maintained at a predetermined ratio (1.6 in this embodiment) between the LOW ratio and the OD ratio, thereby preventing an excessive load from being applied to the toroidal type continuously variable transmission T. For example, when there is a tendency for the ratio to change to the LOW ratio side from the predetermined ratio of 1.6, the pressure SCB that is transmitted from the SC back up valve 119 to the first clutch C1 is decreased thereby allowing an increase in the rotational rate of the output gear 25 of the toroidal type continuously variable transmission T and thus preventing the ratio from changing to the LOW side from the predetermined ratio of 1.6. On the other hand, when there is a tendency for the ratio to change to the OD side from the predetermined ratio of 1.6, the pressure SCB that is transmitted from the SC back up valve 119 to the first clutch C1 is increased, thereby restricting any increase in the rotational rate of the output gear 25 of the toroidal type continuously variable transmission T; and thus, the ratio is prevented from changing to the OD side from the predetermined ratio of 1.6. The power transmission route in this case is shown by the bold lines in FIG. 12A.

Figure 17:
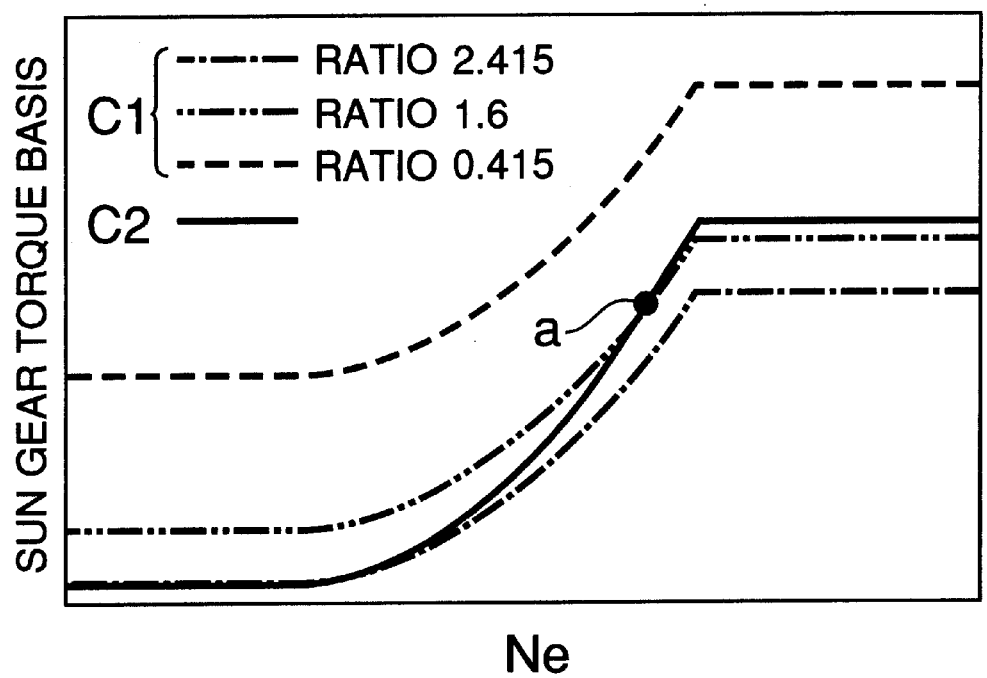

FIG. 17 illustrates the engagement forces of the first and second hydraulic clutches C1 and C2, which have been explained by reference to FIG. 16, converted into the torque of the sun gear 39 of the planetary gear train P. As is clear from FIG. 17, when the ratio is 1.6, the engagement force of the first hydraulic clutch C1 and the engagement force of the second hydraulic clutch C2, on a sun gear 39 torque basis, intersect with each other at point a, and the ratio can thereby be maintained at 1.6 by setting the hydraulic pressure as explained in FIG. 15.

Figure 18:
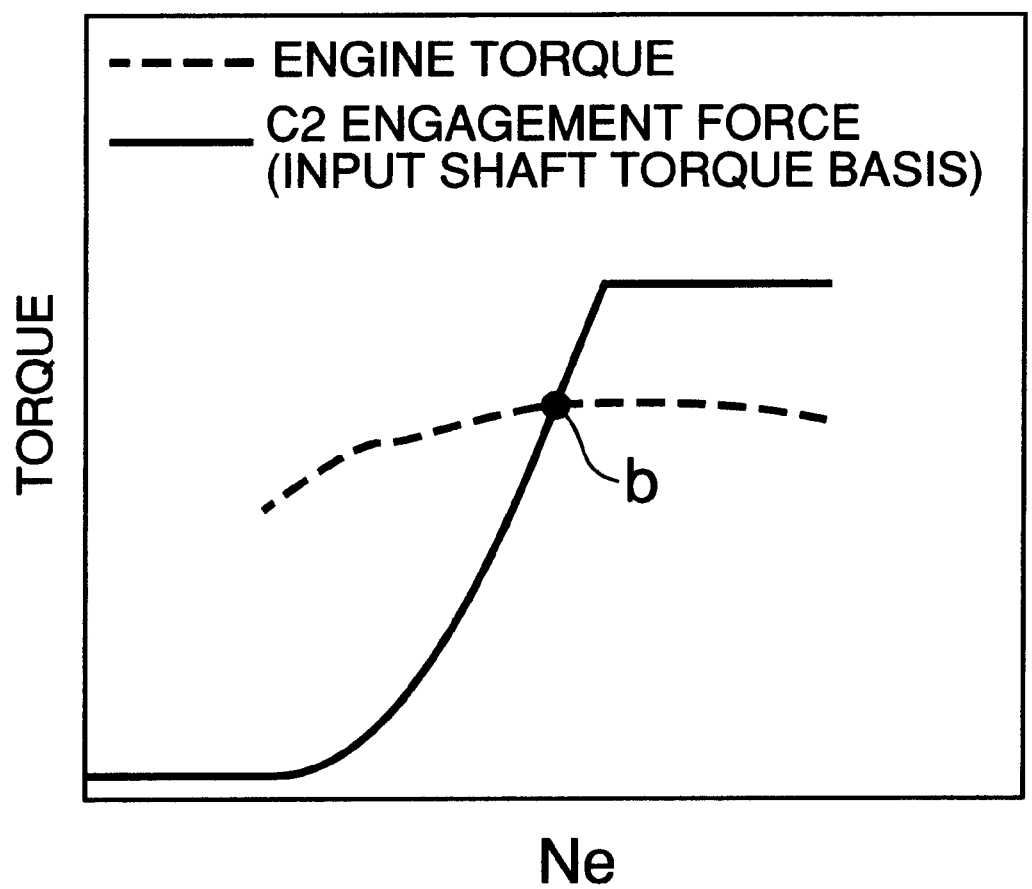

FIG. 18 illustrates changes in the engine torque and the engagement force of the second clutch C2 (on an input shaft 13 torque basis) relative to the rotational rate Ne of the engine at the maximum throttle opening. The higher the rotational rate of the engine Ne, the greater the engagement force of the second clutch C2. The larger the throttle opening, the greater the driving force that is transmitted by the higher rotational rate of the engine. The engagement force of the second clutch C2 is set so that the maximum torque of the engine E can be supported when the rotational rate of the engine Ne is 2500 rpm (point b).

Figure 19:
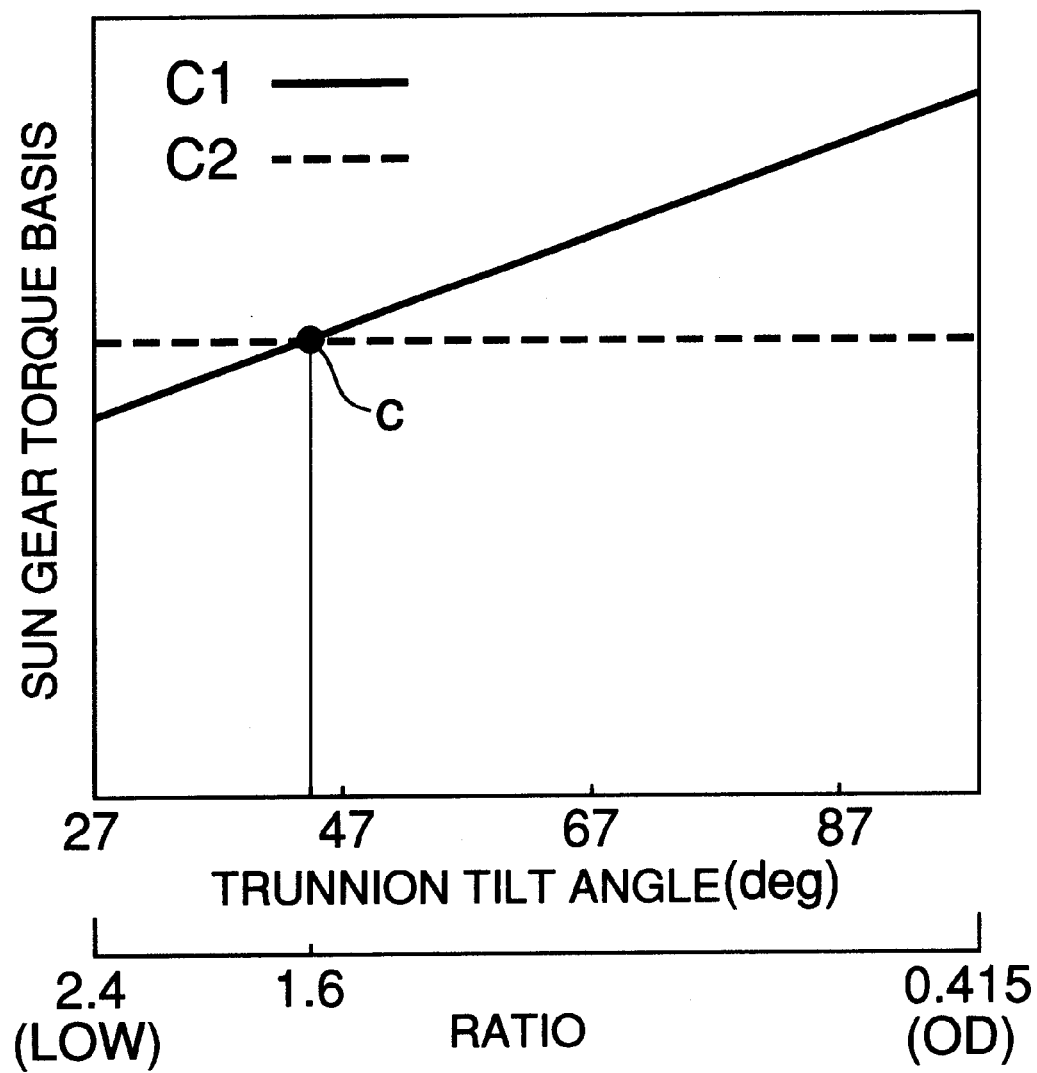

FIG. 19 illustrates the relationship between the tilt angle of the trunnions 73 (that is to say, the ratio of the toroidal type continuously variable transmission T) when the rotational rate of the engine Ne is 2500 rpm and the engagement forces of the first and second clutches C1 and C2 on a sun gear torque basis. The engagement force of the second clutch C2 on a sun gear torque basis is constant regardless of the trunnion tilt angle (ratio), whereas the engagement force of the first clutch C1 on a sun gear torque basis increases in response to an increase in the trunnion tilt angle (a decrease in the ratio) and it can be understood that the ratio at the point c where the two lines intersect is 1.6.

In this embodiment, by preferentially controlling the engagement force of the first clutch C1 and setting the engagement force of the second clutch C2 to be, for example, 30% when the engagement force of the first clutch C1 is 100%, the engagement forces of the first and second clutches C1 and C2 are gradually increased while the ratio is maintained at 1.6 until the engagement force of the first clutch C1 reaches 100%. During this period, since the difference between the rotational rate of the engine and the rotational rate of the driven wheels W is mainly absorbed by slip in the second clutch C2, the second clutch C2 generates heat. However, since the spool of the SC-LUB shift valve 123 moves leftward due to the pressure SI in the same manner as in the above-mentioned case of reversing when the situation is normal, the oil from the LUB port is supplied via the S-L port preferentially to a section of the second clutch C2 that is to be lubricated and cooling is thus achieved.

When the first clutch C1 is completely engaged as the vehicle speed increases, the ratio of the toroidal type continuously variable transmission T increases from the predetermined ratio of 1.6 to the OD ratio, and when it reaches the OD ratio the second clutch C2 is completely engaged. Subsequently, the vehicle is accelerated while maintaining the OD ratio as the rotational rate of the engine increases. The toroidal type continuously variable transmission T does not transmit torque while the ratio is changing from the predetermined ratio of 1.6 to the OD ratio. For example, if the rotational rate output from the toroidal type continuously variable transmission T is slightly less than that expected from the ratio at that time, a load is applied to the power rollers 66, thereby changing the tilt angle, and the ratio of the toroidal type continuously variable transmission T changes in the direction in which the above-mentioned load is not applied. Thus, the toroidal type continuously variable transmission T automatically controls its ratio according to changes in the input and output rotational rates.

(4) When the Vehicle Reverses When a Failure has Occurred

Even when the vehicle reverses in a state in which the electronic control system of the continuously variable transmission system has failed, by transmitting the torque of the engine E to the driven wheels W via the second clutch C2 alone without the torque passing through the toroidal type continuously variable transmission T, the durability of the toroidal type continuously variable transmission T can be prevented from deteriorating. Also in this case, the pressure +TC moves the spool of the shift inhibitor valve 114 leftward, and the second clutch C2 is thus disconnected from the RVS SCC valve 118, which is operated by the electronically controlled solenoid 117, and is connected to the RCS back up valve 120 that outputs the pressure RSB according to the rotational rate of the engine E. The spool of the SERVO valve 113 moves rightward in the same manner as in the above-mentioned case where the vehicle reverses when the situation is normal, and the shifter S is switched over to the reverse side.

When the second clutch C2 is engaged while the first clutch C1 is maintained in a disengaged state so as to reverse the vehicle, since the shifter S has been switched over to the reverse side, the torque of the engine E is transmitted to the driven wheels W via the second clutch C2 without it passing through the toroidal type continuously variable transmission T, and it is possible to prevent an excessive load from being applied to the toroidal type continuously variable transmission T in spite of the electronic control system failing. The power transmission route in this case is shown by the bold line in FIG. 12B.

The second embodiment of the present invention is now explained by reference to FIGS. 20 to 21. The components of the present embodiment that correspond to those in the first embodiment are denoted by the same reference numerals and symbols.

Although the planetary gear train P of the first embodiment shown in FIG. 1 is of a single pinion type, a planetary gear train P of the present embodiment is of a double pinion type. In the first embodiment, the output gear 25 of the toroidal type continuously variable transmission T is connected to the sun gear 39 of the planetary gear train P, whereas in the second embodiment, an output gear 25 of a toroidal type continuously variable transmission T is connected to a carrier 41' of the planetary gear train P. Moreover, in the first embodiment, the driven wheels W are connected to the ring gear 40 of the planetary gear train P, whereas in the second embodiment, driven wheels W are connected to a sun gear 39' of the planetary gear train P. In the first embodiment, the second clutch C2 is connected to the carrier 40 of the planetary gear train P via the shifter S, whereas in the second embodiment, a second clutch C2 is connected to a ring gear 40' of the planetary gear train P via a shifter S. The carrier 41', the sun gear 39' and the ring gear 40' of the planetary gear train P in the second embodiment therefore respectively correspond to the first element, the second element and the third element of the present invention.

Control of a first clutch C1, the second clutch C2 and the shifter S in the second embodiment is carried out in the same manner as in the first embodiment, and the same effects as those obtained in the first embodiment can thereby be obtained. The actions when traveling forward and reversing at normal conditions and when a failure has occurred are explained in outline below.

(1) When the Vehicle Travels Forward at Normal Conditions

When the vehicle travels forward when the situation is normal, the vehicle is started in the direct mode in which the first clutch C1 alone is engaged. When the first clutch C1 is engaged, the ring gear 40' and the sun gear 39' are unified, thereby locking the planetary gear train P, and the shifter S moves to the forward side (the direction of arrow F in FIG. 20). In this case, the torque of the engine E is transmitted to the driven wheels W via the toroidal type continuously variable transmission T and the first clutch C1. More specifically, the torque of the engine E is transmitted to the driven wheels W via a route including a crankshaft 11, a damper 12, an input shaft 13 of the toroidal type continuously variable transmission T, the output gear 25 of the toroidal type continuously variable transmission T, a first helical gear 23, a second helical gear 24, a third helical gear 27, a sleeve 26, the carrier 41' of the planetary gear train P, the sun gear 39' of the planetary gear train P, a third shaft 16, a final drive gear 46, a final driven gear 48, and a differential gear 47, in that order, thereby driving the vehicle forward. During this period, although rotation of the ring gear 40' of the planetary gear train P is transmitted to a clutch inner 38 of the second clutch C2 via a fifth helical gear 33, a fourth helical gear 31, a sleeve 30, the shifter S, and a second shaft 15, in that order, since the second clutch C2 is in a disengaged state, the clutch inner 38 does not impede a clutch outer 20 that is integral with the input shaft 13.

After the first clutch C1 is completely engaged, the vehicle is accelerated as the ratio of the toroidal type continuously variable transmission T changes from LOW to OD.

When the toroidal type continuously variable transmission T reaches the OD ratio, by disengaging the first clutch C1 which has been in an engaged state and changing the ratio of the toroidal type continuously variable transmission T from OD to LOW while engaging the second clutch C2 which has been in a disengaged state, the overall ratio of the continuously variable transmission system is changed beyond the OD ratio in a torque slip mode. In this torque slip mode, the torque of the engine E is transmitted to the ring gear 40' of the planetary gear train P via a route including the crankshaft 11, the damper 12, the input shaft 13 of the toroidal type continuously variable transmission T, a drive sprocket 17, an endless chain 19, a driven sprocket 18, the clutch outer 20 of the second clutch C2, the clutch inner 38 of the second clutch C2, the second shaft 15, the shifter S, the sleeve 30, the fourth helical gear 31, and the fifth helical gear 33, in that order. A majority of the torque that has been transmitted to the ring gear 40' of the planetary gear train P is transmitted to the driven wheels W by a route including the ring gear 40', pinions 43o, pinions 43i, the sun gear 39', the third shaft 16, the final drive gear 46, the final driven gear 48, and the differential gear 47, in that order, thereby driving the vehicle forward. A portion of the torque that has been transmitted to the ring gear 40' of the planetary gear train P is transmitted back to the input shaft 13 of the toroidal type continuously variable transmission T via a route including the ring gear 40', the carrier 41', the sleeve 26, the third helical gear 27, the second helical gear 24, the first helical gear 23, and the output gear 25, in that order, and then from there to the driven wheels W via the above-mentioned route including the second clutch C2.

(2) When the Vehicle Reverses at Normal Conditions

Figure 20:
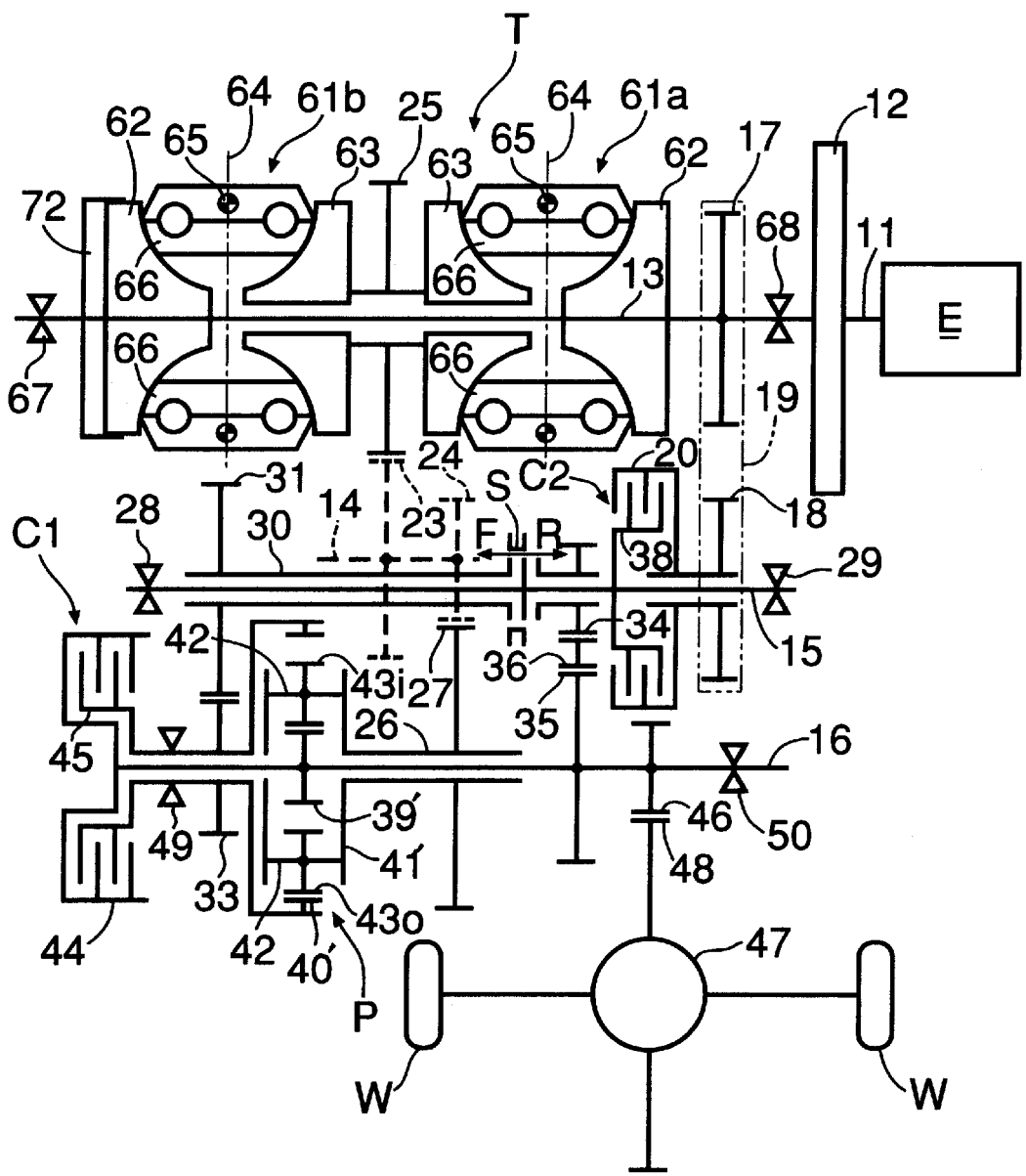
Figure 21A:
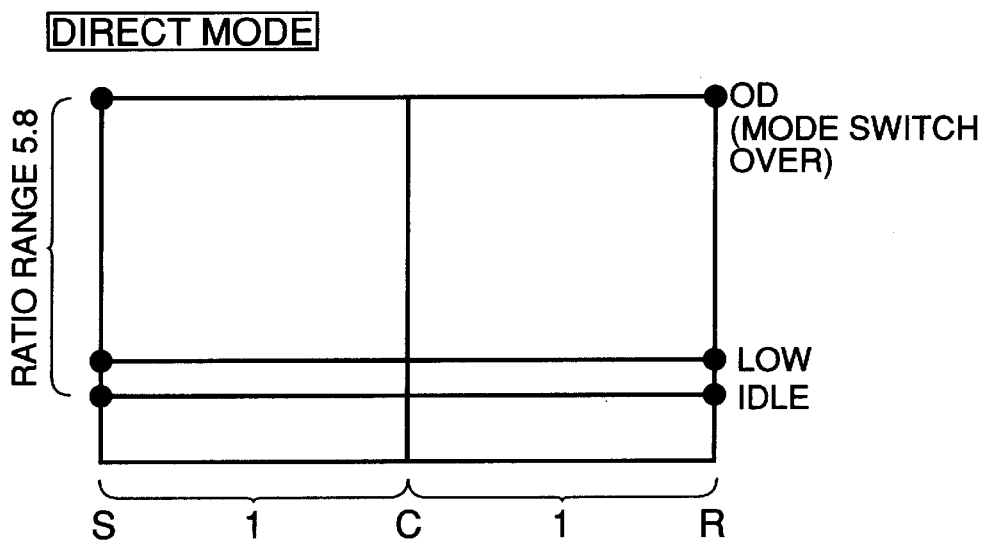
Figure 21B:
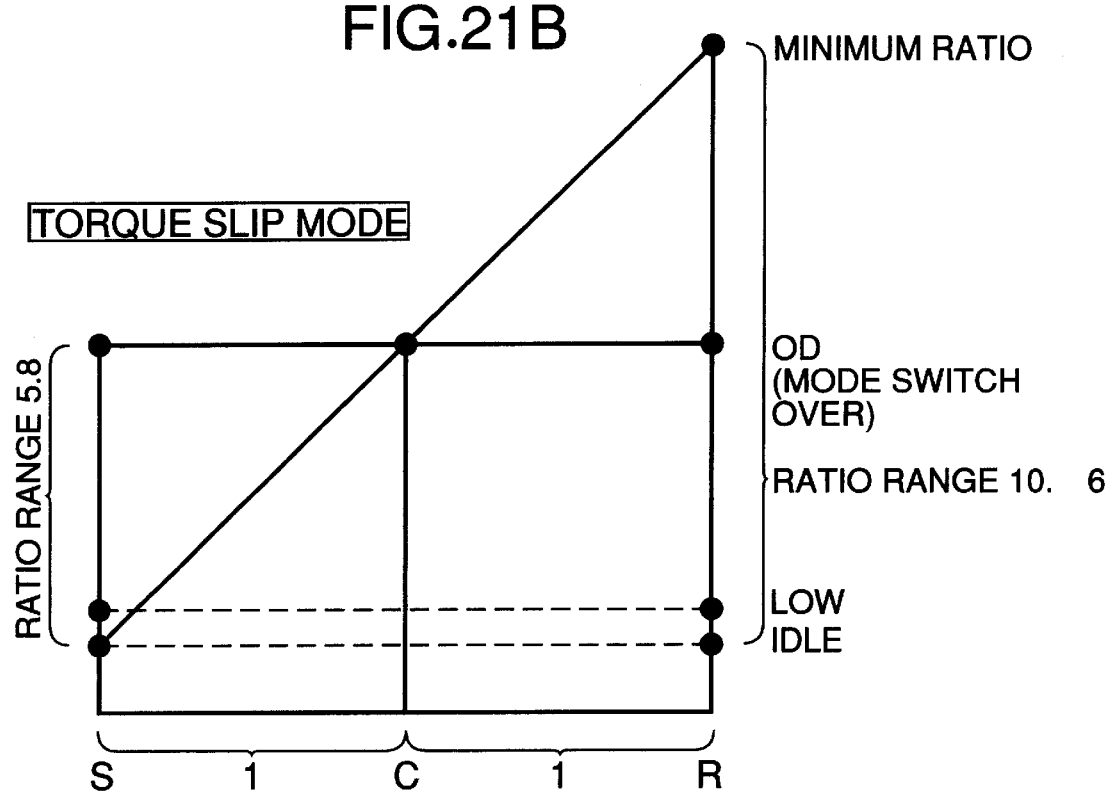

When the vehicle reverses when the situation is normal, the second clutch C2 alone is engaged while the first clutch C1 is maintained in a disengaged state with the shifter S switched over to the reverse side (the direction of arrow R in FIG. 20). The torque of the engine E is thereby transmitted to the driven wheels W via a route including the crankshaft 11, the damper 12, the input shaft 13 of the toroidal type continuously variable transmission T, the drive sprocket 17, the endless chain 19, the driven sprocket 18, the second clutch C2, the second shaft 15, the shifter S, the sixth helical gear 34, the eighth helical gear 36, the seventh helical gear 35, the third shaft 16, the final drive gear 46, the final driven gear 48, and the differential gear 47, in that order, thereby reversing the vehicle. During this period, rotation of the output gear 25 of the toroidal type continuously variable transmission T is input into the carrier 41' of the planetary gear train P and output from the ring gear 40', but since the shifter S has been switched over to the reverse side this does not cause any impediment.

(3) When the Vehicle Travels Forward When a Failure has Occurred

When the electronic control system of the continuously variable transmission system fails, by controlling the engagement forces of the first clutch C1 and the second clutch C2 so that a decrease in the rotational rate of the ring gear 40' due to engagement of the first clutch C1 is counterbalanced by an increase in the rotational rate of the ring gear 40' due to engagement of the second clutch C2, the ratio of the toroidal type continuously variable transmission T can be maintained at a predetermined ratio (1.6 in this embodiment) between the LOW ratio and the OD ratio, thereby preventing an excessive load from being applied to the toroidal type continuously variable transmission T. That is, by connecting the clutch inner 38 of the second clutch C2 to the ring gear 40' of the planetary gear train P by means of the shifter S and gradually engaging the first clutch C1 and the second clutch C2 with predetermined engagement forces, the ratio of the toroidal type continuously variable transmission T can be controlled so as not to change beyond either the LOW ratio or the OD ratio. When the first clutch C1 is completely engaged, the ratio of the toroidal type continuously variable transmission T changes from the above-mentioned predetermined ratio to the OD ratio; and subsequently, when the second clutch C2 is completely engaged the rotational rate of the engine E is increased while the ratio of the toroidal type continuously variable transmission T is maintained at the OD ratio, thereby accelerating the vehicle. During this period, the torque of the engine E is transmitted to the driven wheels W via the second clutch C2, the shifter S, and the planetary gear train P. Therefore, the toroidal type continuously variable transmission T only carries out speed change and is not involved in the transmission of torque.

(4) When the Vehicle Reverses When a Failure has Occurred

Also in the case where the vehicle reverses in a state in which the electronic control system of the continuously variable transmission system has failed, by transmitting the torque of the engine E to the driven wheels W via the second clutch C2 alone without it passing through the toroidal type continuously variable transmission T in the same way as when the situation is normal, the durability of the toroidal type continuously variable transmission T can be prevented from deteriorating.

In accordance with the present embodiment, the overall ratio range of the continuously variable transmission system can be widened from 8.7 as in the first embodiment to 10.6 while the ratio range of the planetary gear train P is maintained at 5.8 as in the first embodiment. The other actions and effects of the second embodiment are the same as the above-mentioned actions and effects of the first embodiment.

The third embodiment of the present invention is now explained by reference to FIG. 22.

The continuously variable transmission systems of the first and second embodiments are suitable for front-engined front wheel drive vehicles in which the engine E is transversely mounted. However, the continuously variable transmission system of the present embodiment is suitable for a front-engined rear wheel drive vehicle in which the engine E is longitudinally mounted. The components of the present embodiment that correspond to those in the first and second embodiments are denoted using the same reference numerals and symbols.

A first shaft 131 and a second shaft 132 are coaxially placed with an input shaft 13 of a toroidal type continuously variable transmission T. The first shaft 131 rotates integrally with the input shaft 13, and the second shaft 132 is connected to driven wheels W (not illustrated). A third shaft 133 and a fourth shaft 134 are placed in parallel to the first shaft 131 and the second shaft 132. A first helical gear 135 and a second helical gear 136 are fixedly provided on the third shaft 133. A third helical gear 137 and a fourth helical gear 138 are fixedly provided on the fourth shaft 134. The first helical gear 135 on the third shaft 133 meshes with an output gear 25 of the toroidal type continuously variable transmission T. The second helical gear 136 on the third shaft 133 meshes with a fifth helical gear 139 that is integral with a carrier 41' of a planetary gear train P and a clutch inner 45 of a first clutch C1. A clutch outer 20 of a second clutch C2 is fixed to the first shaft 131, and a clutch inner 38 thereof is fixed to a sleeve 140 that is fitted around the outer periphery of the first shaft 131. When the second clutch C2 is engaged, the first shaft 131 is therefore connected to the sleeve 140. A sixth helical gear 142 provided on a sleeve 141 that is fitted around the outer periphery of the sleeve 140 meshes with the third helical gear 137 on the fourth shaft 134 via a seventh helical gear 143. The fourth helical gear 138 on the fourth shaft 134 meshes with an eighth helical gear 144 on the second shaft 132.

When a shifter S moves to the forward side (the direction of arrow F in FIG. 22), a ring gear 40' of the planetary gear train P is connected to the sleeve 140, and when the shifter S moves to the reverse side (the direction of arrow R in FIG. 22), the sixth helical gear 142 is connected to the sleeve 140. A clutch outer 44 of the first clutch C1 is integral with the second shaft 132, and when the first clutch C1 is engaged, the carrier 41' of the planetary gear train P therefore becomes integral with a sun gear 39' via the second shaft 132, thereby locking the planetary gear train P.

The carrier 41', the sun gear 39' and the ring gear 40' of the planetary gear train P in the third embodiment respectively correspond to the first element, the second element and the third element of the present invention.

Control of the first clutch C1, the second clutch C2 and the shifter S in the third embodiment is carried out in the same manner as in the first embodiment, and the same effects as those obtained in the first embodiment can be obtained. The actions when traveling forward and reversing when the situation is normal and when a failure has occurred are explained briefly below.

(1) When the Vehicle Travels Forward at Normal Conditions

When the vehicle travels forward at normal conditions, the vehicle is started in the direct mode, in which the first clutch C1 alone is engaged. When the first clutch C1 is engaged, the carrier 41' and the sun gear 39' are unified, thereby locking the planetary gear train P, and the shifter S moves to the forward side (the direction of arrow F in FIG. 22). In this case, the torque of the engine E is transmitted to the driven wheels W via the toroidal type continuously variable transmission T and the first clutch C1. More specifically, the torque of the engine E is transmitted to the driven wheels W via a route including the crankshaft 11, the damper 12, the input shaft 13 of the toroidal type continuously variable transmission T, the output gear 25 of the toroidal type continuously variable transmission T, the first helical gear 135, the third shaft 133, the second helical gear 136, the fifth helical gear 139, the first clutch C1, and the second shaft 132, in that order, thereby driving the vehicle forward. During this period, although rotation of the carrier 41' of the planetary gear train P is transmitted to the clutch inner 38 of the second clutch C2 via the ring gear 40', the shifter S, and the sleeve 140, in that order, since the second clutch C2 is in a disengaged state the clutch inner 38 does not impede the clutch outer 20 that is integral with the input shaft 13.

After the first clutch C1 is completely engaged, the vehicle is accelerated as the ratio of the toroidal type continuously variable transmission T changes from LOW to OD.

When the toroidal type continuously variable transmission T reaches the OD ratio, by disengaging the first clutch C1 which has been in an engaged state, and changing the ratio of the toroidal type continuously variable transmission T from OD to LOW while engaging the second clutch C2 which has been in a disengaged state, the overall ratio of the continuously variable transmission system is changed beyond the OD ratio in a torque slip mode. In this torque slip mode, the torque of the engine E is transmitted to the ring gear 40' of the planetary gear train P via a route including the crankshaft 11, the damper 12, the input shaft 13 of the toroidal type continuously variable transmission T, the first shaft 131, the clutch outer 20 of the second clutch C2, the clutch inner 38 of the second clutch C2, the sleeve 140, and the shifter S, in that order. A majority of the torque that has been transmitted to the ring gear 40' of the planetary gear train P is transmitted to the driven wheels W by a route including the carrier 41', the sun gear 39', and the second shaft 132, in that order, thereby driving the vehicle forward. A portion of the torque that has been transmitted to the ring gear 40' of the planetary gear train P is transmitted back to the input shaft 13 of the toroidal type continuously variable transmission T via a route including the carrier 41', the fifth helical gear 139, the second helical gear 136, the third shaft 133, the first helical gear 135, and the output gear 25, in that order, and from there to the driven wheels W via the above-mentioned route including the second clutch C2.

(2) When the Vehicle Reverses at Normal Conditions

Figure 22:
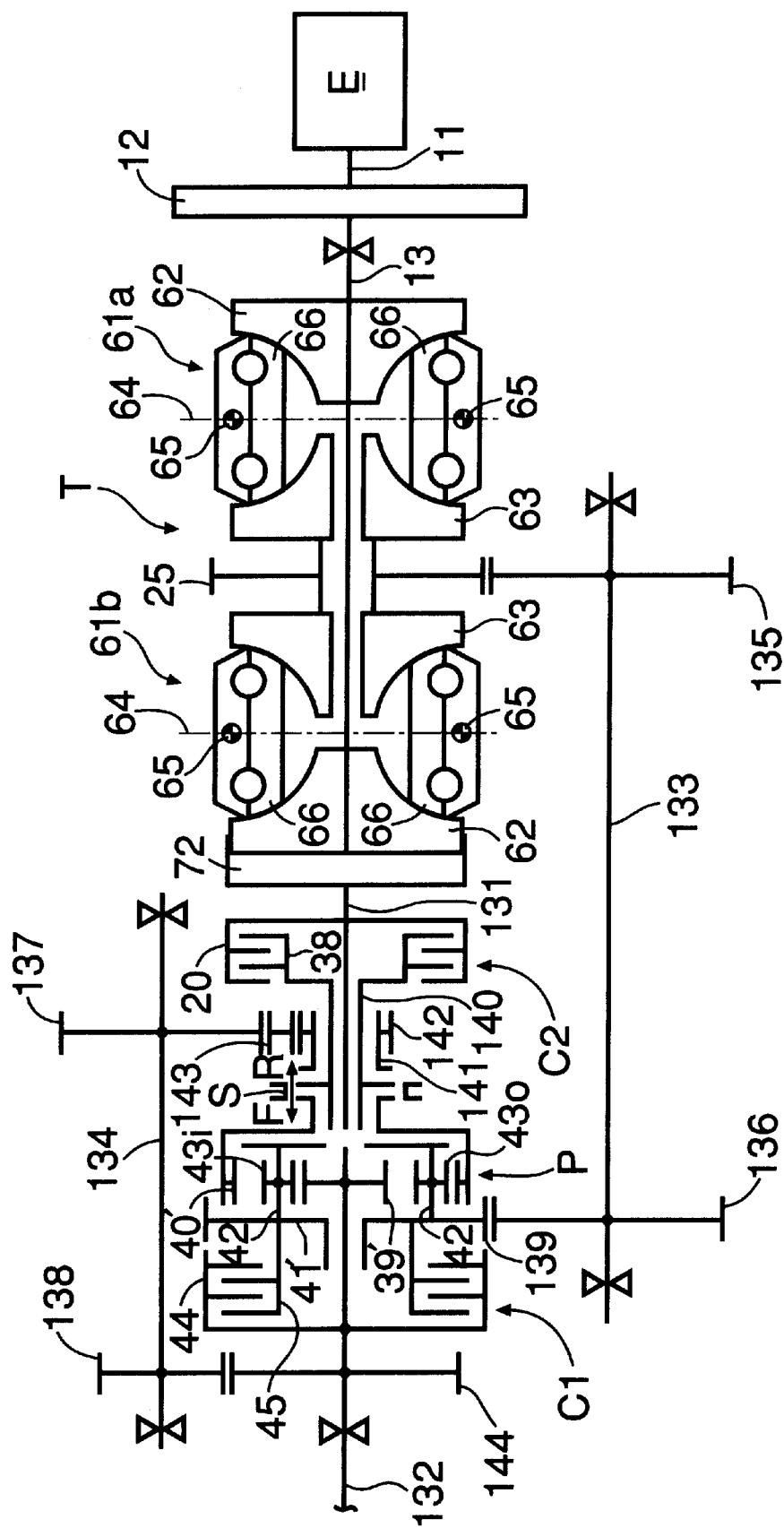
FIG. 22 is a skeleton diagram of a continuously variable transmission system related to a third embodiment of the present invention.

When the vehicle reverses at normal conditions, the second clutch C2 alone is engaged while the first clutch C1 is maintained in a disengaged state with the shifter S switched over to the reverse side (the direction of arrow R in FIG. 22). The torque of the engine E is thereby transmitted to the driven wheels W via a route including the crankshaft 11, the damper 12, the input shaft 13 of the toroidal type continuously variable transmission T, the first shaft 131, the second clutch C2, the sleeve 140, the shifter S, the sixth helical gear 142, the seventh helical gear 143, the third helical gear 137, the fourth shaft 134, the fourth helical gear 138, the eighth helical gear 144, and the second shaft 132, in that order, thereby reversing the vehicle. During this period, rotation of the output gear 25 of the toroidal type continuously variable transmission T is input into the carrier 41' of the planetary gear train P and output from the ring gear 40', but since the shifter has been switched over to the reverse side, this does not cause any impediment.

(3) When the Vehicle Travels Forward When a Failure has Occurred

When the electronic control system of the continuously variable transmission system fails, by controlling the engagement forces of the first clutch C1 and the second clutch C2 so that a decrease in the rotational rate of the carrier 41 due to engagement of the first clutch C1 is counterbalanced by an increase in the rotational rate of the ring gear 40' due to engagement of the second clutch C2, the ratio of the toroidal type continuously variable transmission T can be maintained at a predetermined ratio (1.6 in this embodiment) between the LOW ratio and the OD ratio, thereby preventing an excessive load from being applied to the toroidal type continuously variable transmission T. That is, by connecting the clutch inner 38 of the second clutch C2 to the ring gear 40' of the planetary gear train P by means of the shifter S and gradually engaging the first clutch C1 and the second clutch C2 with predetermined engagement forces, the ratio of the toroidal type continuously variable transmission T is controlled so as not to change beyond either the LOW ratio or the OD ratio. When the first clutch C1 is completely engaged, the ratio of the toroidal type continuously variable transmission T changes from the above-mentioned predetermined ratio to the OD ratio; and subsequently, when the second clutch C2 is completely engaged, the rotational rate of the engine E is increased while the ratio of the toroidal type continuously variable transmission T is maintained at the OD ratio, thereby accelerating the vehicle. During this period, the torque of the engine E is transmitted to the driven wheels W via the second clutch C2, the shifter S and the planetary gear train P. Therefore, the toroidal type continuously variable transmission T only carries out speed change and is not involved in the transmission of torque.

(4) When the Vehicle Reverses When a Failure has Occurred

Also in the case where the vehicle reverses in a state in which the electronic control system of the continuously variable transmission system has failed, by transmitting the torque of the engine E to the driven wheels W via the second clutch C2 alone without it passing through the toroidal type continuously variable transmission T in the same manner as when the situation is normal, the durability of the toroidal type continuously variable transmission T can be prevented from deteriorating.

In accordance with the third embodiment, the same functional effects can be obtained as in the above-mentioned first and second embodiments.

In the present embodiments, a toroidal type continuously variable transmission T of a double cavity type is illustrated, but the present invention can be applied to a toroidal type continuously variable transmission of a single cavity type and also to a continuously variable transmission other than a toroidal type continuously variable transmission. Furthermore, the relationships of the sun gear, the ring gear and the carrier of the planetary gear train P to the first, second, and third elements can be appropriately chosen.

Although the embodiments of the present invention have been explained in detail above, the present invention can be modified in a variety of ways without departing from the spirit and scope of the invention.

What is claimed is:

1. A clutch control system in a continuously variable transmission system for a vehicle, the continuously variable transmission system comprising:

a continuously variable transmission having an input member into which a torque of an engine is input and an output member to change the speed of rotation of the input member and to output the rotation;

a planetary gear train having a first element, a second element and a third element, the first element being connected to the output member of the continuously variable transmission and the second element being connected to driven wheels;

a first clutch to engage the first element of the planetary gear train with the second element thereof; and a second clutch for engaging the engine and the third element of the planetary gear train, wherein the clutch control system comprises:

a first control valve that controls the degree of engagement of the first clutch in accordance with the rotational rate of the engine and the shift ratio, and a second control valve that controls the degree of engagement of the second clutch in accordance with the rotational rate of the engine, wherein when an electronic control system of the continuously variable transmission fails, the engaging forces of the first and second clutches are determined so that a change in the rotational rate of the first element and due to engagement of the first clutch and a change in the rotational rate of the third element due to engagement of the second clutch are counterbalanced by each other.

2. The clutch control system in a continuously variable transmission system for a vehicle as recited in claim 1, wherein when an electronic control system of the continuously variable transmission fails in forward the clutch control system gradually engages in the first clutch and the second clutch and the ratio of the continuously variable transmission is set at a predetermined ratio between a low ratio and an OD ratio, when the first clutch is completely engaged the ratio of the continuously variable transmission is changed from the predetermined ratio toward the OD ratio, when the second clutch is completely engaged the ratio of the continuously variable transmission is fixed at the OD ratio.

3. The clutch control system in a continuously variable transmission system for a vehicle as recited in claim 1, wherein when the electronic control system of the continuously variable transmission fails in reverse the second clutch is engaged and transmits torque from an engine to drive wheels of the vehicle.

* * * * *